United States Patent
Yoon et al.

(10) Patent No.: US 11,175,776 B2
(45) Date of Patent: Nov. 16, 2021

(54) ELECTRONIC DEVICE INCLUDING AN OPTICAL SENSOR MOUNTED ON BACK SURFACE OF A DISPLAY

(71) Applicant: Samsung Electronics Co., Ltd., Gyeonggi-do (KR)

(72) Inventors: Heewoong Yoon, Gyeonggi-do (KR); Jeongho Cho, Gyeonggi-do (KR); Sangjin Kim, Gyeonggi-do (KR); Jongah Kim, Gyeonggi-do (KR); Donghan Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/931,985

(22) Filed: Jul. 17, 2020

(65) Prior Publication Data
US 2021/0019015 A1 Jan. 21, 2021

(30) Foreign Application Priority Data
Jul. 18, 2019 (KR) .......................... 10-2019-0086990

(51) Int. Cl.
*G06F 3/041* (2006.01)
*G01S 17/08* (2006.01)
*H05K 5/00* (2006.01)

(52) U.S. Cl.
CPC ............ *G06F 3/0418* (2013.01); *G01S 17/08* (2013.01); *H05K 5/0017* (2013.01)

(58) Field of Classification Search
CPC ........ G01S 17/08; G01S 7/4813; G01S 17/04; G06F 3/0418; G06F 3/017; G06F 3/011;
(Continued)

(56) References Cited

U.S. PATENT DOCUMENTS 10,251,040 B2 4/2019 Park et al.
2011/0267298 A1* 11/2011 Erhart .................. G06F 1/1684
345/173
(Continued)

FOREIGN PATENT DOCUMENTS

JP 2017-142596 8/2017

OTHER PUBLICATIONS

International Search Report dated Oct. 29, 2020 issued in counterpart application No. PCT/KR2020/009289, 8 pages.

*Primary Examiner* — Nelson M Rosario
(74) *Attorney, Agent, or Firm* — The Farrell Law Firm, P.C.

(57) ABSTRACT

An electronic device is provided. The electronic device includes a housing including a front surface, a rear surface opposite to the front surface, and a space between the front surface and the rear surface, a display located inside the housing and viewed through the front surface of the housing to the outside of the electronic device, a support member supporting the display by protruding from the side surface toward the inside of the housing, an optical sensor including a light emitting unit and a light receiving unit wherein the optical sensor is located on a rear surface of the display and overlaps at least one area of the display when viewed from top of the front surface; and a partition wall member formed of an elastic material wherein the partition wall member is located between the display and the optical sensor, and at least a part region of the partition wall member is located between the light emitting unit and the light receiving unit to separate the light emitting unit and the light receiving unit.

15 Claims, 21 Drawing Sheets

(58) Field of Classification Search
CPC ...... G06F 3/0304; G06F 3/042; G06F 3/0421;
G06F 2203/04108; H04M 1/026; H04M
1/724; H04M 2201/34; H04M 2201/38;
H04M 2250/12; H04M 1/72403; H04M
1/72412; H04M 2250/52; H04N 5/2252;
H04N 5/2257; H05K 5/0017; A61B
5/0013; A61B 5/002; A61B 5/0022; A61B
5/02108; A61B 5/1172; A61B 5/318;
A61B 5/681; A61B 5/6844; A61B
5/6898; A61B 5/7235; A61B 5/7405;
A61B 5/7435; A61B 5/7455; A61B
5/746; A61B 5/7475; A61B 8/04; A61B
2560/0214; A61B 2560/0242; A61B
5/02427; G16H 40/67; G01J 1/0271;
G01J 1/06; H01L 31/16; B60J 5/00
See application file for complete search history.

(56) References Cited

U.S. PATENT DOCUMENTS

| | | |
|---|---|---|
| 2015/0049062 A1 | 2/2015 | Kim et al. |
| 2015/0331106 A1 | 11/2015 | Okada |
| 2017/0119307 A1 | 5/2017 | Shim et al. |
| 2017/0300736 A1* | 10/2017 | Song .................... G06K 9/0004 |
| 2018/0067245 A1 | 3/2018 | Giachino et al. |
| 2020/0218391 A1* | 7/2020 | Kamiya .................... G09F 9/30 |

* cited by examiner

ELECTRONIC DEVICE INCLUDING AN OPTICAL SENSOR MOUNTED ON BACK SURFACE OF A DISPLAY

CROSS-REFERENCE TO RELATED APPLICATION(S)

This application is based on and claims priority under 35 U.S.C. § 119 to Korean Patent Application No. 10-2019-0086990, filed on Jul. 18, 2019, in the Korean Intellectual Property Office, the disclosure of which is incorporated by reference herein in its entirety.

BACKGROUND

1. Field

The present disclosure relates generally to an electronic device including an optical sensor mounted on a back surface of a display of the electronic device.

2. Description of Related Art

An optical sensor is a type of device that detects information contained in light by converting it into electrical signals, and is composed of a light emitting unit and a light receiving unit to obtain information about an object.

Specifically, the optical sensor obtains the information of the object, such as the shape and movement of the object by measuring the amount of light generated by the light emitting unit reflected on the object and returned to the light receiving unit.

Such an optical sensor is applied to a mobile device and is used to grasp information such as whether a user exists in a location adjacent to the mobile device or whether the user's body is accessing the mobile device.

Since an optical sensor is a sensor that uses light, it has been common to mount the optical sensor on a bezel area of a mobile device in order to secure transmittance, but recently, a method of mounting the optical sensor on a back (rear) surface of a display of an electronic device to enlarge an area of the display is proposed.

Mounting an optical sensor on the back of a display of an electronic device has an advantage that a display area can be widened compared to a case where the optical sensor is mounted on a bezel area, but performance of the optical sensor deteriorates due to diffused reflection generated at the bottom (or back) of the display.

Specifically, the diffused reflection generated at the bottom of the display increases the crosstalk, and due to the increased the crosstalk, a light receiving unit is not able to separate incoming signals reflected by the object from the crosstalk. That is, when the optical sensor is mounted on the back surface of the display, the display area is enlarged, but the performance of the optical sensor for sensing object information such as the shape and movement of the object may deteriorate.

SUMMARY

The present disclosure has been made to address the above-mentioned problems and disadvantages, and to provide at least the advantages described below.

According to an aspect of the present disclosure, an electronic device includes a housing including a front surface, a back surface opposite to the front surface, and a side surface surrounding a space between the front face and the back surface, a display located inside the housing and visible to an outside of the electronic device through the front surface of the housing, a support member supporting the display by protruding from the side surface toward the inside of the housing, an optical sensor, including a light emitting unit and a light receiving unit, located on a back surface of the display, when viewed from a top of the front surface, to overlap at least one area of the display, and a partition wall member, formed of an elastic material, located between the optical sensor and the display, wherein the partition wall member has at least a portion located between the light emitting unit and the light receiving unit to separate the light emitting unit and the light receiving unit.

According to another aspect of the present disclosure, an electronic device includes a housing including a front surface, a rear surface opposite to the front surface, and a side surface surrounding a space between the front surface and the rear surface, a display located inside the housing, visible to an outside of an electronic device through the front surface of the housing, a waterproof layer attached to a rear surface of the display, a support member, located on a rear surface of the waterproof layer, supporting the display by protruding from the side surface toward the inside of the housing, an optical sensor, including a light emitting unit and a light receiving unit, located on the rear surface of the display, when viewed from a top of the front surface, to overlap at least one area of the display, and a partition wall member, formed of an elastic material, located between the optical sensor and the display, wherein the partition wall member has at least a portion located between the light emitting unit and the light receiving unit to separate the light emitting unit and the light receiving unit.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
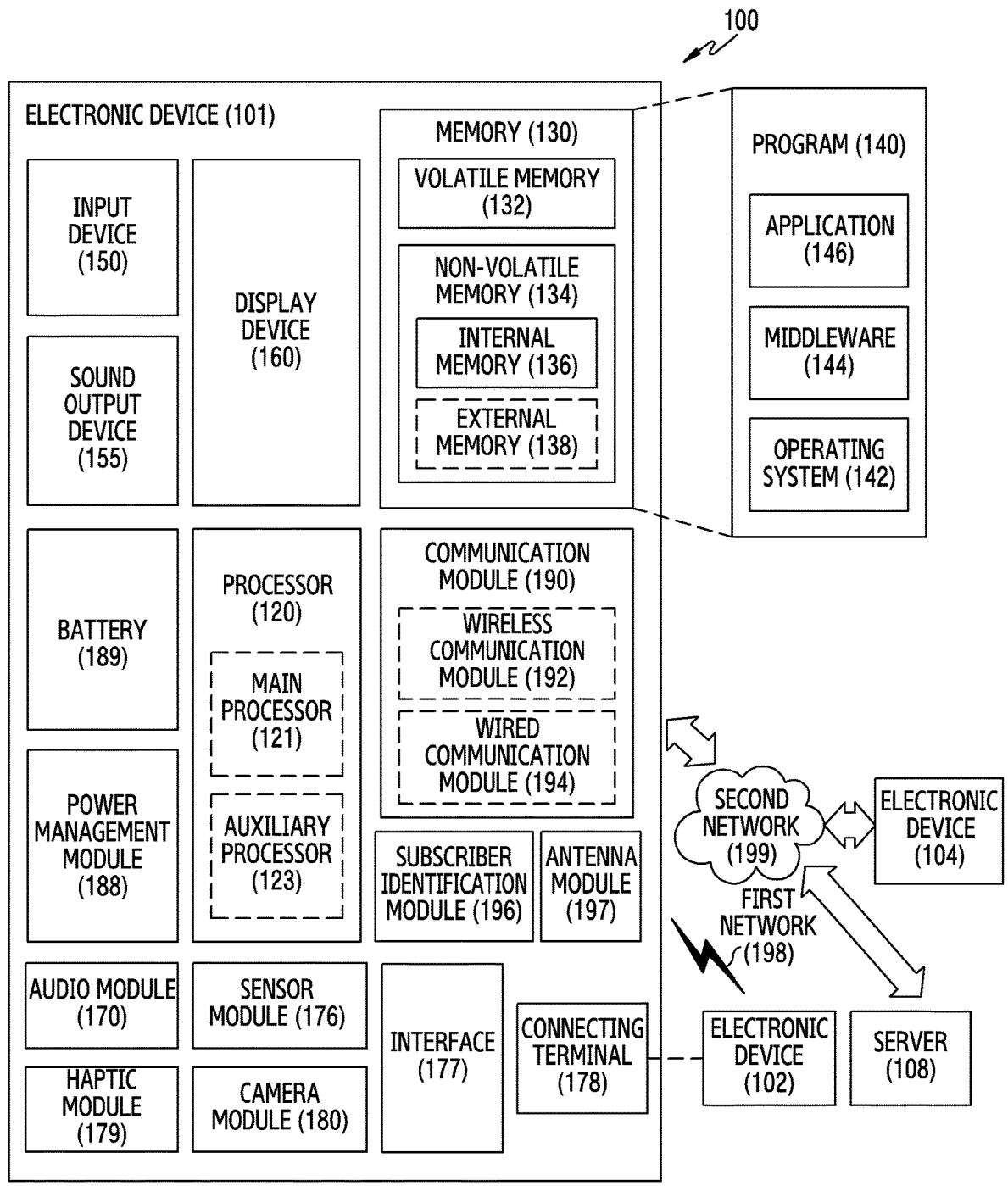
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Accordingly, the present disclosure is to provide an electronic device capable of preventing deterioration of the performance of an optical sensor by arranging the optical sensor on the back surface of the display while reducing crosstalk caused by diffused reflection.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
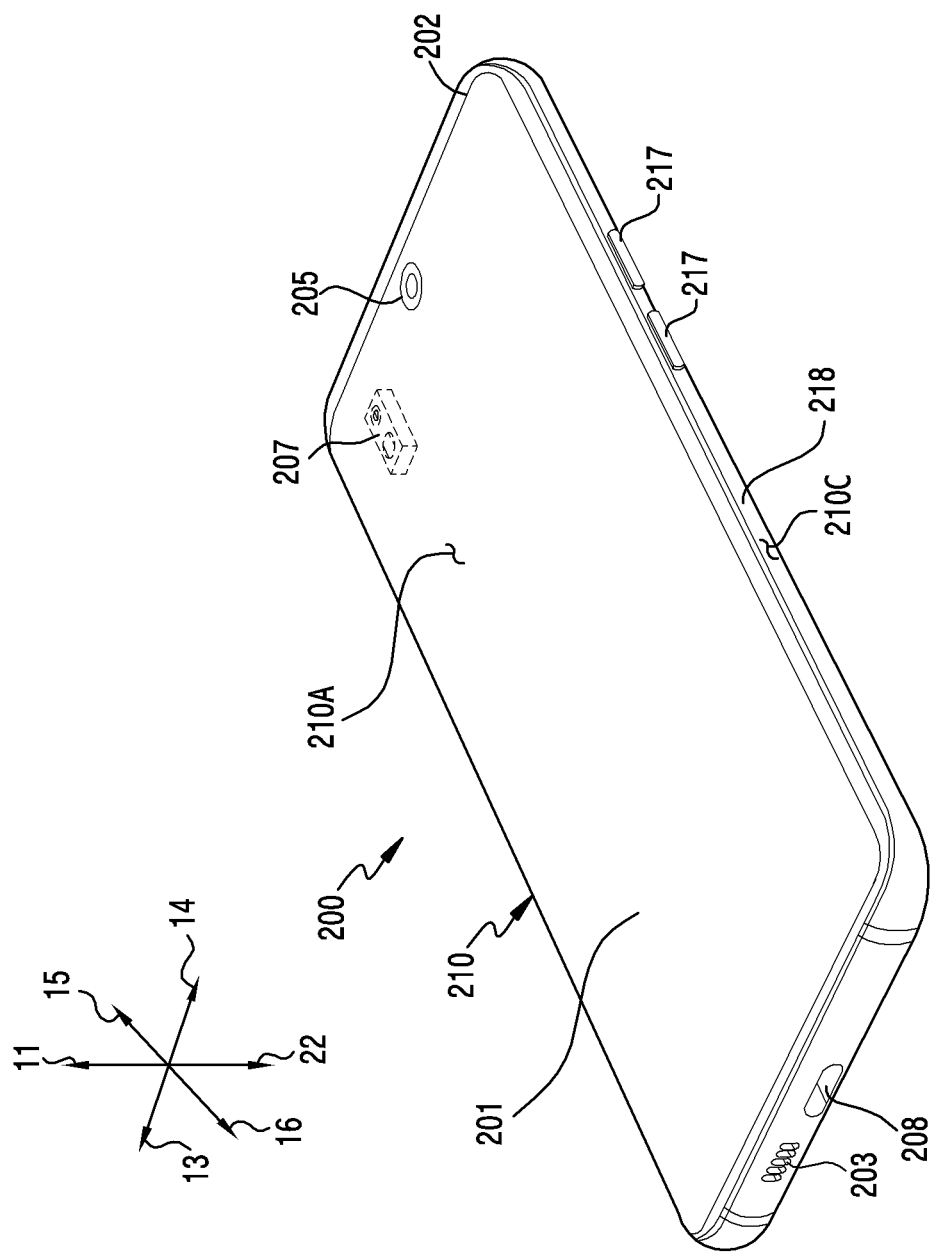
FIG. 2A is a perspective view of an electronic device, according to an embodiment.
Figure 2B:
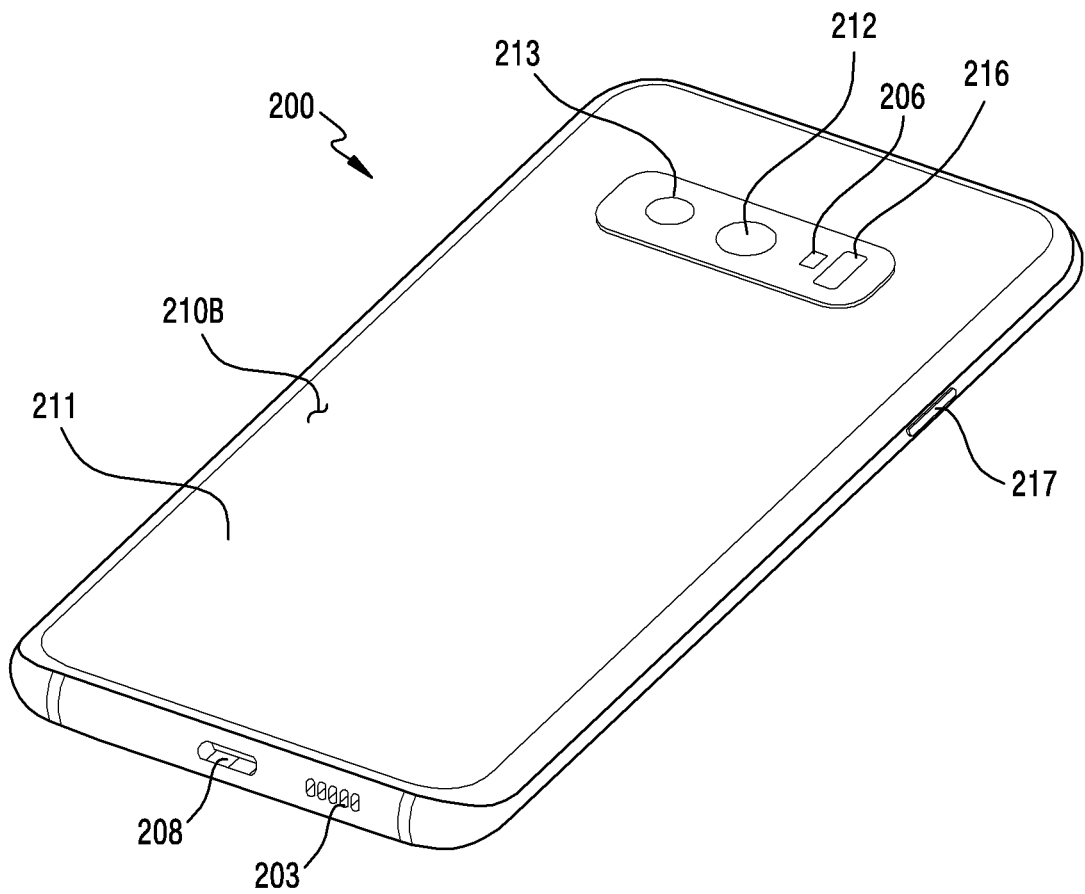
FIG. 2B is a perspective view of an electronic device of FIG. 2A from a back side, according to an embodiment.

FIG. 2A is a perspective view illustrating an electronic device 200, according to an embodiment. FIG. 2B is a perspective view illustrating a rear face of the electronic device 200 of FIG. 2a, according to an embodiment.

Referring to FIG. 2A and FIG. 2B, an electronic device 200 includes a housing 210 including a first face (or a front face) 210A, a second face (or a rear face) 210B, and a lateral face 210C surrounding a space between the first face 200A and the second face 210B. The housing may refer to a structure which constitutes part of the first face 210A, second face 210B, and third face 210C.

The front plate 202 may include two first regions 210D seamlessly extended by being bent from the first face 210A toward the rear plate 211 at both ends of a long edge of the front plate 202. The rear plate 211 may include two second regions 210E seamlessly extended by being bent from the second face 210B toward the front plate 202 at both ends of a long edge. The front plate 202 (or the rear plate 211) may include only one of the first regions 210D (or the second regions 210E). Some of the first regions 210D or the second regions 210E may not be included. In a lateral view of the electronic device 200, the lateral bezel structure 218 may have a first thickness (or width) at a lateral face in which the first regions 210D or the second regions 210E are not included, and may have a second thickness thinner than the first thickness at a lateral face in which the first regions 210E or the second regions 210E are included.

The first surface 210A may be formed by a front plate 202 (e.g., a glass plate including various coating layers, or a polymer plate) at least partially substantially transparent. The front plate 202 may include a curved portion that extends smoothly from the first surface 210A toward the rear plate 211.

The second surface 210B may be formed by a substantially opaque back plate 211. The back plate 211 may be formed by, for example, coated or colored glass, ceramic, polymer, metal (e.g., aluminum, stainless steel (STS), or magnesium), or a combination of at least two of the above materials. The back plate 211 may include a curved portion that extends from the second surface 210B toward the front plate 202 and extends seamlessly.

The side 210C is coupled to the front plate 202 and the back plate 211, and may be formed by a side bezel structure (side member or sidewall) 218 comprising metal and/or polymer. Back plate 211 and side bezel structure 218 may be integrally formed and include the same material (e.g., a metal material such as aluminum).

The electronic device 200 may include at least one of a display 201, an audio module 203, a sensor module 207, a first camera module 205, a second camera module 206, a third camera module 212, a fourth camera module 213, a key input device 217, and a connector hole 208. The electronic device 200 may omit at least one of the components (e.g., the key input device 217) or additionally include other components.

The electronic device 200 may include a sensor module (e.g., a proximity sensor or an illuminance sensor). The sensor module 207 may be disposed at a position adjacent to the display 201. The sensor module may be mounted on the rear surface of the display 201 within an area provided by the front plate 202, and may be disposed in an integrated state with the display 201.

The electronic device 200 may further include a light emitting element disposed at a position adjacent to the display 201 within an area provided by the front plate 202. The light emitting device may provide status information of the electronic device 200 in a light form. The light emitting element may provide, for example, a light source interlocked with the operation of the camera module. The light emitting device may include, for example, at least one of light emitting diode (LED), an infrared (IR) LED, and a xenon lamp. The display 201 may be viewed outside the electronic device 200 through a significant portion of the front plate 202. The edge of the display 201 may be formed to be substantially the same as an adjacent outer shape (e.g., a curved surface) of the front plate 202. In order to expand the area in which the display 201 is visible, a gap between the outer edge of the display 201 and the outer edge of the front plate 202 may be substantially the same. A recess or opening is formed in a part of the screen display area of the display 201, and in another electronic component, for example, a camera module 205 (aligned with the recess or the opening), a proximity sensor or an illuminance sensor.

At least one of the first camera module 212, the second camera module 213, the fingerprint sensor 216, and the flash 206 may be included on the rear surface of the screen display area of the display 201. The display 201 may be coupled to or adjacent to a touch sensing circuit, a pressure sensor capable of measuring the intensity (pressure) of the touch, and/or a digitizer detecting a magnetic field type stylus pen.

The audio module may include a microphone hole and a speaker hole 203. In the microphone hole, a microphone for acquiring external sound may be arranged inside, and in some embodiments, a plurality of microphones may be arranged to sense the direction of sound. The speaker hole 203 and the microphone hole may be implemented as one hole, or only a speaker (e.g., a piezo speaker) may be included without a separate speaker hole.

The electronic device 200 may generate an electrical signal or data value corresponding to an internal operating state or an external environmental state by including a sensor module. The sensor module may include a fingerprint sensor integrated or adjacent to the display 201 and/or a biometric sensor (e.g., a heart rate monitor (HRM) sensor) disposed on the second surface 210B of the housing 210. The electronic device 200 includes a sensor module, for example, a gesture sensor, a gyro sensor, a barometric pressure sensor, a magnetic sensor, an acceleration sensor, a grip sensor, a color sensor, an IR sensor, a living body sensor, a temperature sensor, a humidity sensor, or an illuminance sensor.

The first camera module 205 is disposed on the first surface 210A of the electronic device 200, and the third camera module 212 is disposed on the second surface 210B, and/or second camera module 206 (e.g., flash). The first camera module 205, the third camera module 212, and the fourth camera module 213 may include one or more lenses, an image sensor, and/or an ISP. The second camera module 206 may include, for example, an LED or a xenon lamp. Two or more lenses (IR camera, wide-angle lens and telephoto lens) and image sensors may be disposed on one side of the electronic device 200.

The key input device 217 may be disposed on the side 210C of the housing 210. The electronic device 200 may not include some or all of the above-mentioned key input devices 217, and the key input devices 217 may be implemented in other forms such as soft keys on the display 201. The key input device 217 may include at least a portion of the fingerprint sensor 216 disposed on the second side 210B of the housing 210.

The connector hole 208 is a first connector hole that can receive a connector (e.g., a USB connector) for transmitting and receiving power and/or data to and from an external electronic device, and/or transmit and receive audio signals to and from an external electronic device. The electronic device 200 may include a second connector hole (for example, an earphone jack) that can accommodate a connector for. The first connector hole and the second connector hole may be implemented as one hole 208. The electronic device 200 transmit and receive power and/or data to and from an external electronic device without a connector hole. It is also possible to transmit and receive audio signals.

Figure 3:
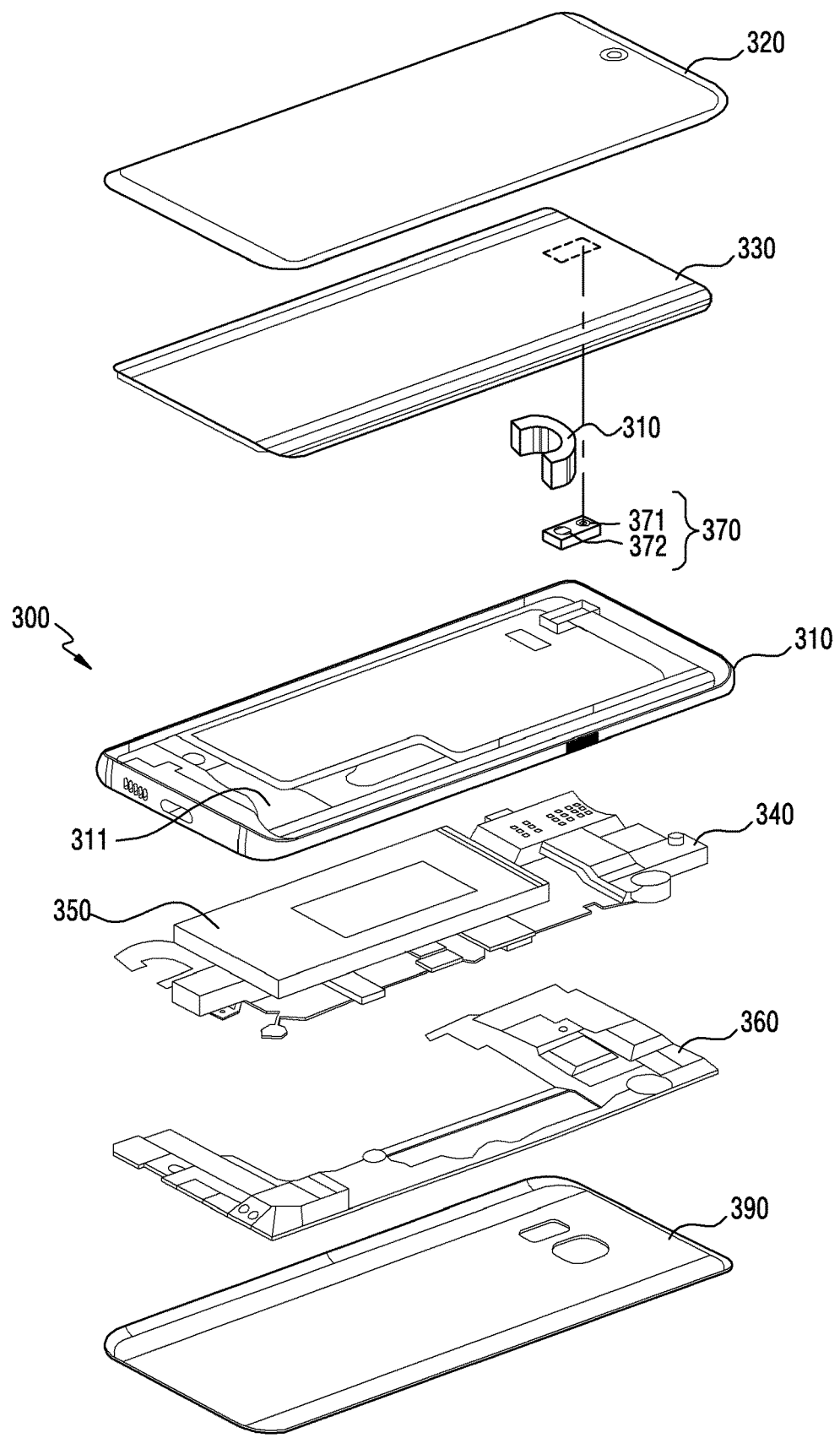
FIG. 3 is an exploded perspective view of an electronic device, according to an embodiment.

FIG. 3 is an exploded perspective view of an electronic device, according to an embodiment.

Referring to FIG. 3, the electronic device 300 includes a housing 310, a first support member 311 (e.g., a bracket), a front plate 320, display 330, a PCB 340, a battery 350, a second support member 360 (e.g., a rear case), an optical sensor 370, a partition member 380 and a rear plate 390. The electronic device 300 may omit at least one of the components (e.g., the first support member 311 or the second support member 360) or additionally include other components. At least one of the components of the electronic device 300 may be the same or similar to at least one of the components of the electronic device 200 of FIGS. 2A and 2B, and duplicate descriptions will be omitted below.

The housing 310 includes a first surface (e.g., a front surface 210A in FIG. 2A), a second surface (e.g., a back surface 210B in FIG. 2B), and a side surface (e.g., a side surface 210C in FIG. 2B) extending along the edge of the first surface and the second surface and surrounding an internal space of the electronic device 300.

The first support member 311 may be disposed inside the electronic device 300 and connected to the side surface of the housing 310, or may be integrally formed with the side surface of the housing 310. The first support member 311 may be formed of a metal material and/or a non-metal (e.g., a polymer) material. The display 330 may be coupled to one surface of the first support member 311 and the PCB 340 may be coupled to the other surface.

The front plate 320 forms a first surface of the electronic device 300. The edge of the front plate 320 is connected to a part of the side surface (or side wall) of the housing 310. The front plate 320 is formed of a transparent polymer material such as polycarbonate (PC), polymethyl methacrylate (PMMA), polyimide (PE), polyethylene terephthalate (PET) and polypropylene terephthalate (PPT) or a glass material. Here, the transparent polymer or the glass material is only an example of a material of which the front plate 320 is formed, and the material of the front plate 320 is not necessarily limited thereto.

The display 330 is formed of a plurality of layers, and is disposed between the front plate 320 and a first support member 311. The display 330 includes a base substrate, a thin film transistor (TFT) layer, an electrode layer, an organic material layer, or a pixel layer. The display 330 further includes any suitable component, such as a thin film encapsulation layer that encapsulates the pixel layer and a back film for supporting the base substrate. The display 330 emits a light from a pixel in order to transmit information to the user, and the emitted light is transmitted to the outside through the front plate 320.

The display 330 may include a display panel or a touch panel. The touch panel may be disposed on cells of the display panel. The display 330 may be combined with or adjacent to a part of a touch sensing circuit connected to a touch panel in order to sense a touch, a pressure sensor capable of measuring the intensity (pressure) of a touch, or a digitizer for detecting a magnetic field type stylus pen.

The PCB 340 may be equipped with a processor 120, a memory, and/or an interface. The processor may include one or more of a CPU, an AP, a GPU, an ISP, a sensor hub processor, or a CP. The memory may include volatile memory or nonvolatile memory. The interface may include an HDMI, a USB interface, an SD card interface, and/or an audio interface. The interface may electrically or physically connect the electronic device 300 to an external electronic device, and may include a USB connector, an SD card/MMC connector, or an audio connector.

The battery 350 is a device for supplying power to at least one component of the electronic device 300, and may include a non-rechargeable primary cell, a rechargeable secondary cell, or a fuel cell. In one example, an opening is formed in the 340, such that at least a portion of the battery 350 may be disposed on the same plane as the PCB 340. The battery 350 may be integrally disposed inside the electronic device 300 or may be detachably disposed with the electronic device 300.

The optical sensor 370 is located on a rear surface of the display 330 and includes a light emitting unit 371 and a light receiving unit 372. The optical sensor 370 measures amount of light generated from the light emitting unit 371, reflected back to the object (e.g., a user) and returned to the light receiving unit 372, thereby determining information such as whether an object is present or an approach of an object within a predetermined distance from the electronic device.

The partition wall member 380 is positioned between the display 330 and the optical sensor 370, and separate the light emitting unit 371 and the light receiving unit 372 in the optical sensor 370. When the light emitting unit 371 of the optical sensor 370 generates light at a rear (or bottom) of the display 330, a diffused reflection is generated due to the display 330, and a disturbance input, that is, crosstalk, to the light receiving unit 372 increases. The partition wall member 380 is located between the light emitting unit 371 and the light receiving unit 372 in order to prevent the diffused light from entering the light receiving unit 372. As a result, even though the optical sensor 370 is located on the rear surface of the display 330, performance degradation of the optical sensor 370 is prevented.

Figure 4:
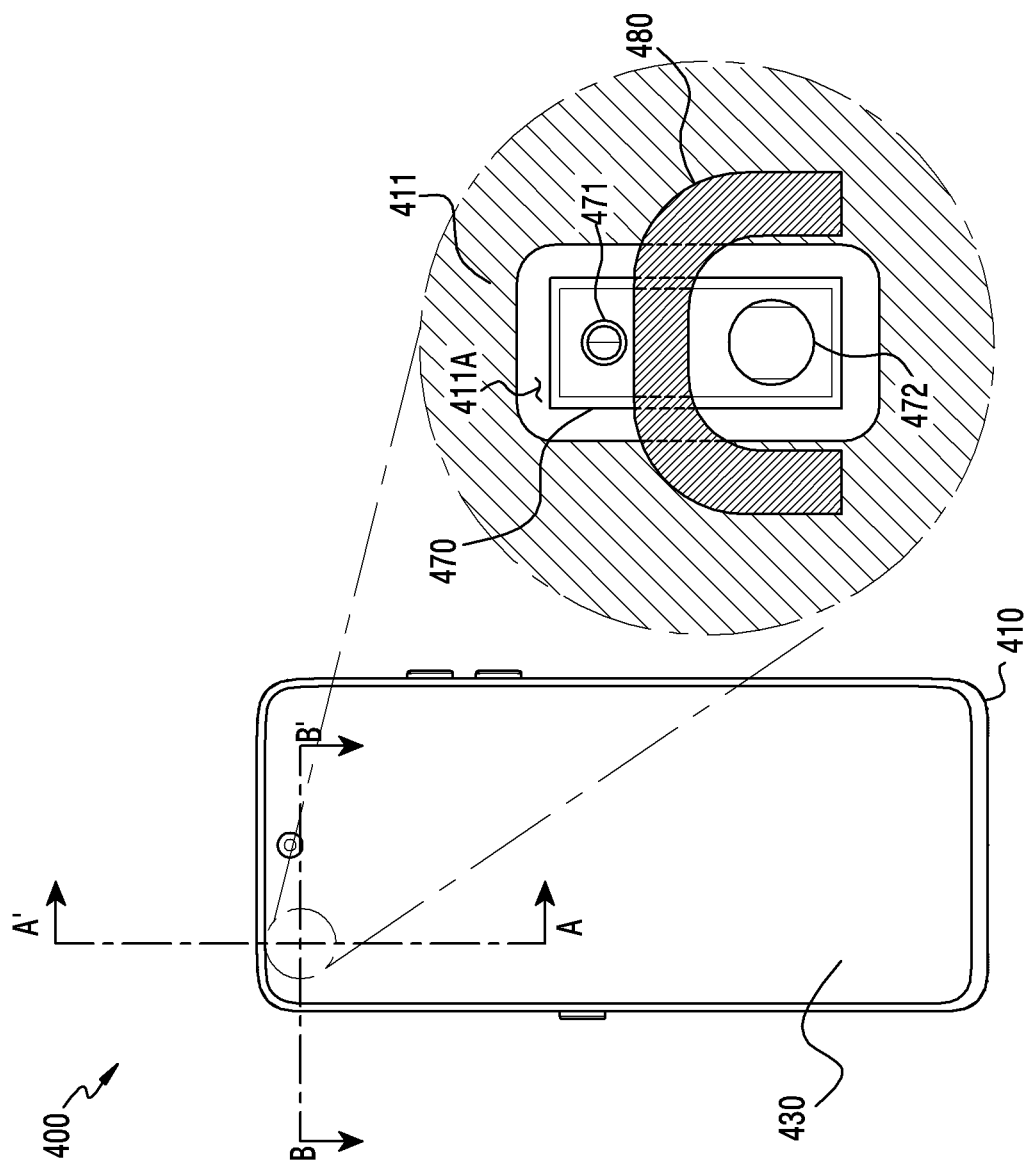
FIG. 4 is a view showing a partition wall member and an optical sensor disposed on a rear surface of a display of an electronic device, according to an embodiment.

FIG. 4 is a diagram illustrating a partition wall member 480 and an optical sensor 470 disposed on the rear surface of the display 430 of the electronic device 400, according to an embodiment.

Referring to FIG. 4, the electronic device 400 includes a housing 410, a support member 411, a display 430, an optical sensor 470, and a partition wall member 480. At least one of the components of the electronic device 400 may be the same as or similar to at least one of the components of the electronic device 300 of FIG. 3, and duplicated description will be omitted below.

The optical sensor 470 is located on the rear surface (or bottom) of the display 430, when viewed from the front of the housing 410, so as to overlap with at least one area of the display 430. The optical sensor 470 includes a light emitting unit 471 and a light receiving unit 472. An opening 411A penetrating at least one region of the support member 411 is formed in the support member 411 so that the optical sensor 470 is able to be located inside the opening 411A.

The partition wall member 480 is located between the display 430 and the optical sensor 470. The partition wall member 480 is formed of a black material and is able to absorb the crosstalk incident in the direction to a light receiving unit 472. For example, the partition wall member 480 is formed of a compressible resilient material (such as sponge, rubber or polymer) so that even if an external pressure is applied on the display 430, damage of the display 430 by the optical sensor 470 can be prevented.

The partition wall member 480 forms a pillar shape surrounding at least a part of peripheral area of the light receiving unit 472. The partition wall member 480 is formed in a "C" shape bent in the direction to the light receiving unit 472 when viewed from top front of the housing 410. Since the partition wall member 480 is formed in a pillar shape surrounding at least a part of peripheral area of the light receiving unit 472, it separates the light emitting unit 471 from the light receiving unit 472 of the optical sensor 470.

TABLE 1

| | Crosstalk without a partition wall member (analog to digital converter units (ADC)) | Crosstalk with a partition wall member (ADC) |
|---|---|---|
| Sample 1 | 11349 | 479 |
| Sample 2 | 14572 | 229 |

Table 1 is a table showing ADC converted amounts of crosstalk flown into the light receiving unit 472 according to the presence or absence of the partition wall member 480.

Referring to Table 1, in the case that the partition wall member 480 is not located between the light emitting unit 471 and the light receiving unit 472 of the optical sensor 470, amounts of the crosstalk flown into the light receiving unit 472 are 10000 or more (e.g., sample 1 indicates 11349 and sample 2 indicates 14572) (ADC converted value). In the case that the partition wall member 480 is located between the light emitting unit 471 and the light receiving unit 472 of the optical sensor 470, amounts of the crosstalk flown into the light receiving unit 472 are reduced to a value of 500 or less (e.g., sample 1 indicates 479 and sample 2 indicates 229) (ADC converted value). That is, amounts of crosstalk flown into the light receiving unit 472 is reduced by about 95% in the electronic device 400 by having the partition wall member 480 between the light emitting unit 471 and the light receiving unit 472.

Figure 5A:
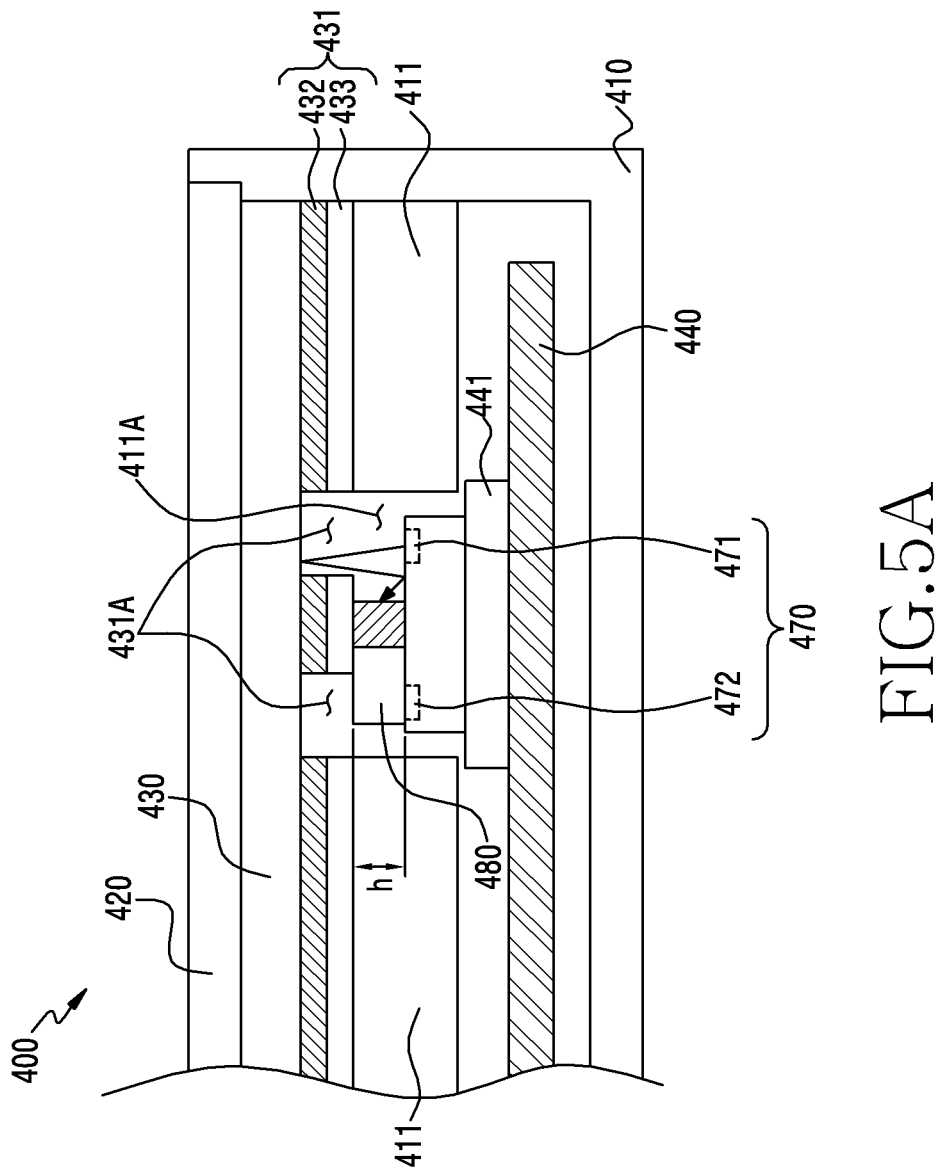
FIG. 5A is a cross sectional view of the electronic device of FIG. 4 taken along the direction A-A', according to an embodiment.
Figure 5B:
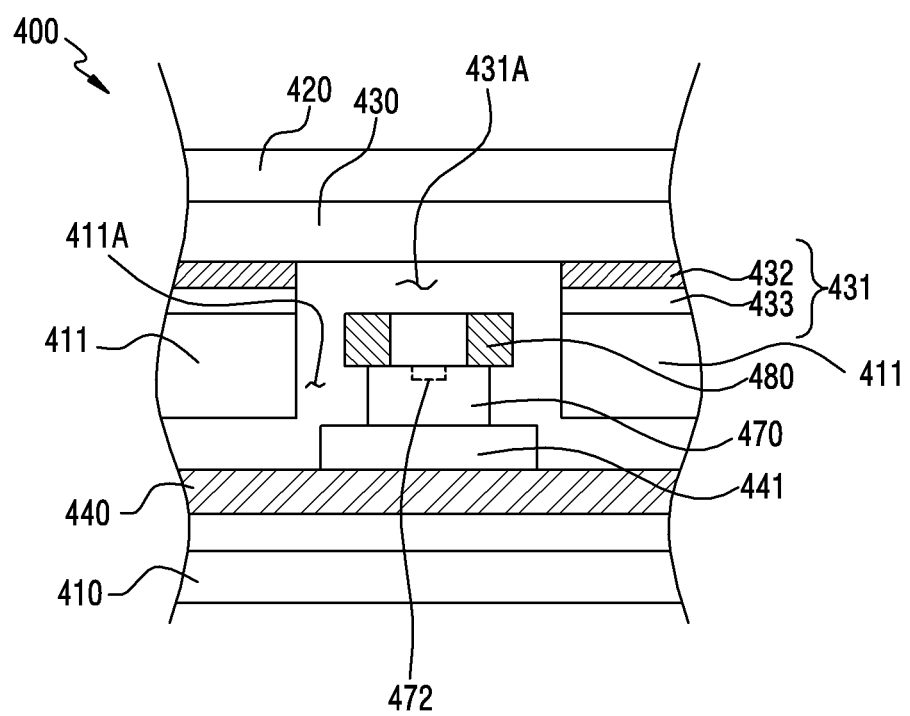
FIG. 5B is a cross sectional view of the electronic device of FIG. 4, taken along the direction B-B', according to an embodiment.

FIG. 5A is a cross sectional view taken in the direction of A-A' direction in an electronic device 400 of FIG. 4. FIG. 5B is a cross sectional view taken in the direction of B-B' in the electronic device 400 of FIG. 4.

Referring to FIG. 5A and FIG. 5B, an electronic device 400 includes a housing 410, a front plate 420, a display 430, a cover panel 431, a support member 411, an optical sensor 470, a partition wall member 480, an interposer 441 and a PCB 440.

The cover panel 431 is attached on a back surface of the display 430 so that a twist or a bending of the display 430 is prevented. For example, the cover panel 431 includes a black-coated embossed layer 432 and a metal layer 433. The black-coated embossed layer 432 includes a emboss (embo) pattern, and has a rugged bumpy region and a structure containing bubbles. Also, since the black-coated embossed layer 432 has been black-coated, a view into the electronic device 400 from outside the electronic device 400 is prohibited (prevented). The metal layer 433 prevents the display 430 from being twisted or bended. According to an embodiment, the metal layer 433 is formed of copper (Cu).

The cover panel 431 has a region in which at least one-hole 431A is formed.

In one example, the at least of one hole 431A is formed at a position corresponding to a location of the light emitting unit 471 and a location of a light receiving unit 472 of the optical sensor 470 located on the rear (back) surface of the display 430 so that the light generated in the light emitting unit 471 passes through the display 430 or the light reflected by the object (e.g. a user) flows into the light receiving unit 472.

The support member 411 is formed by protruding from the side surface of the housing 410 or is formed integrally with the side surface of the housing 410 so that it supports the display 430 on which a cover panel 431 is attached. A support member 411 includes at least one region in which an opening 411A for the mounting of the electronic component (e.g., optical sensor) is formed.

An optical sensor 470 is located inside an opening 411A of the support member 411 in order to obtain information such as the presence or absence of an object or approach of the object within a predetermined distance from the electronic device. For example, the optical sensor 470 is electrically connected to a PCB 440 below the optical sensor 470 via an interposer 441. That is, an output value including information of an object of the optical sensor 470 is transmitted to the electrically connected PCB 440, and a processor 120 mounted on the PCB 440 controls the driving, including on/off, of an electronic device 400 in response to the output value of the optical sensor 470.

The partition wall member 480 is located between the display 430 and the optical sensor 470, in particular between the cover panel 431 attached to the rear surface of the display 430 and the optical sensor 470. The partition wall member 480 is formed of a pillar shape surrounding at least a part of the peripheral area of a light receiving unit 472 of the optical sensor 470 so that an inflow of crosstalk, generated due to a diffused refection, into a light receiving unit 472 is blocked (see FIG. 5A). For example, the partition wall member 480 is an elastic material (such as a sponge, a rubber having a high compression ratio, or a polymer), and the partition wall member 480 is located in a compressed state between the display 430 and the optic sensor 470 so that there is no gap between the display 430 and the optic sensor 470. That is, for the area in which the partition wall member 480 is disposed, an internal space between the display 430 and the optic sensor 470 is completely shielded.

The partition wall member 480 is formed of an elastic material having an indicated compression ratio (compressibility) so that a height deviation of the optical sensor 470, the interposer 441, and/or the PCB 440, occurring during the manufacturing process, can be compensated.

TABLE 2

| | sample 1 | sample 2 |
|---|---|---|
| airgap | 0.29 | 0.24 |
| thickness of a partition wall member | 0.3 | 0.3 |
| thickness of a partition wall member based on a compression ratio | 0.2 | 0.2 |
| overlap | 0.01 | 0.06 |
| overlap based on a compression ratio | −0.09 | −0.04 |

Table 2 is a table which shows a compensation effect of a height deviation of the partition wall member 480.

Referring to Table 2, as an example, if the shortest distance between the display 430 and the optical sensor 470, that is, the distance (airgap) (e.g., h in FIG. 5A) between the bottom (or back) of the cover panel 431 and the optical sensor 470 is 0.3 millimeter (mm), the actual airgap may not be 0.3 mm due to an overlap occurred due to the height variation of the optical sensor 470, the interposer 441, and/or the PCB 440. For example (e.g., sample 1 in Table 2), if the overlap that occurred during the manufacturing process becomes 0.01 mm, the actual airgap is 0.29 mm. Alternatively (e.g., sample 2 in Table 2), if the overlap that occurred during the manufacturing process is 0.06 mm, the actual airgap becomes 0.24 mm.

When designed such that the distance between the cover panel 431 and the optical sensor 470 is 0.3 mm, the partition wall member 480 having 0.3 mm thickness (or height) corresponding to the airgap is disposed between the cover panel 431 and the optical sensor 470. The partition wall member 480 is formed of a material having a compression ratio of 33%, the thickness (or height) of the partition wall member 480 may be compressed by 0.2 mm due to the external pressure. That is, in one example (e.g., sample 1 in Table 2), the overlap is 0.01 mm. Here, the partition wall member 480 is able to compensate an additional deviation up to 0.09 mm. Alternatively (e.g., sample 2 in Table 2), if the overlap generated is 0.06 mm, the partition wall member 480 is able to compensate an additional deviation up to 0.04 mm.

It is preferable that the partition wall member 480 is formed of a material having a compression ratio of above 30% in order to compensate the deviation that occurred during the manufacturing process for the optical sensor 470, the interposer 441, and/or the PCB 440. When considering the cost of manufacturing and the availability of mass production, it is preferable that the partition wall member 480 is formed of a material having a compression ratio of between 30% and 40%. However, it is also acceptable that the partition wall member 480 is formed of a material having a compression ratio of less than 30% or more than 40%.

Figure 6A:
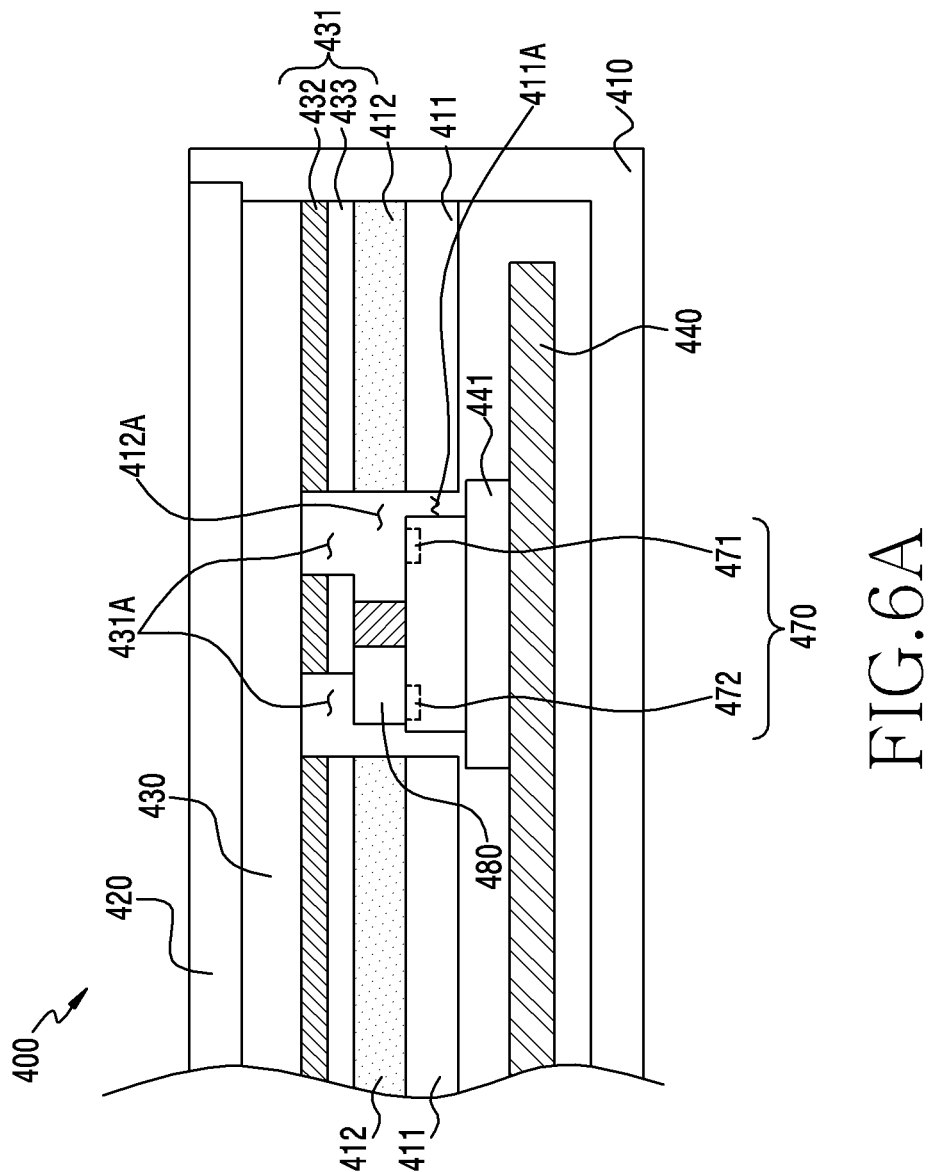
FIG. 6A is a cross sectional view of the electronic device of FIG. 4 taken along the direction A-A', according to an embodiment.
Figure 6B:
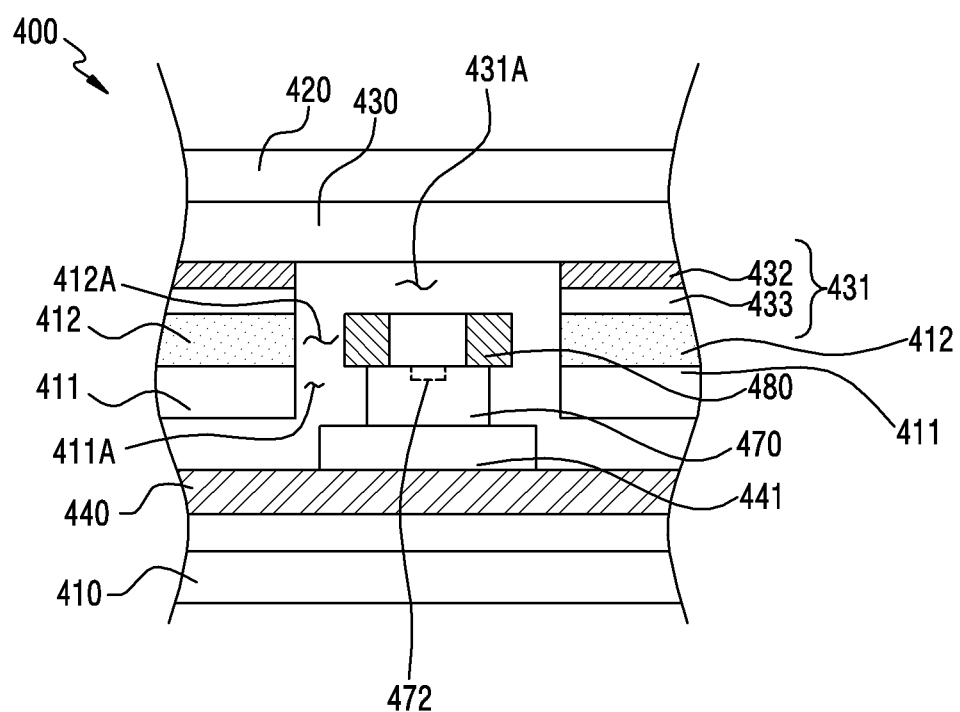
FIG. 6B is a cross sectional view of the electronic device of FIG. 4 taken along the direction B-B', according to an embodiment.

FIG. 6A is a cross sectional view of the electronic device of FIG. 4 taken along the direction A-A', according to an embodiment. FIG. 6B is a cross sectional view of the electronic device of FIG. 4 taken along the direction B-B', according to an embodiment.

With reference to FIG. 6A and FIG. 6B, the electronic device 400 includes a housing 410, a front plate 420, a display 430, a cover panel 431, a support member 411, an optical sensor 470, a partition wall members 480, an interposer 441, a PCB 440, and a waterproof layer 412. Description of the same or similar components of an electronic device as in FIG. 5A and FIG. 5B will be omitted.

The waterproof layer 412 is located between a cover panel 431 attached to a back surface of the display 430 and the support member 411 and it prevents water entering between the cover panel 431 and the support member 411. For example, the waterproof layer 412 is formed of a waterproof tape, and is attached to the lower surface of the cover panel 431 and the upper surface of the support member 411, respectively.

An opening 412A is formed in one region of the waterproof layer 412 corresponding to an opening 411A of the support member 411. The opening 412A provides a space in which the electronic parts are mounted. The optical sensor 470 is located inside the opening 412A of the waterproof layer 412 and the opening 411A of the support member 411 such that it is able to obtain information as to the presence or absence of an object and/or an approach of the object within a predetermined distance from the electronic device.

The partition wall member 480 is located inside the opening 412A of the waterproof layer 412 and the opening 411A of the support member 411 and it is formed in a pillar shape surrounding at least a portion of peripheral area of a light receiving unit 472 such that it separates the light emitting unit 471 and the light receiving unit 472 of the optical sensor 470.

Figure 7:
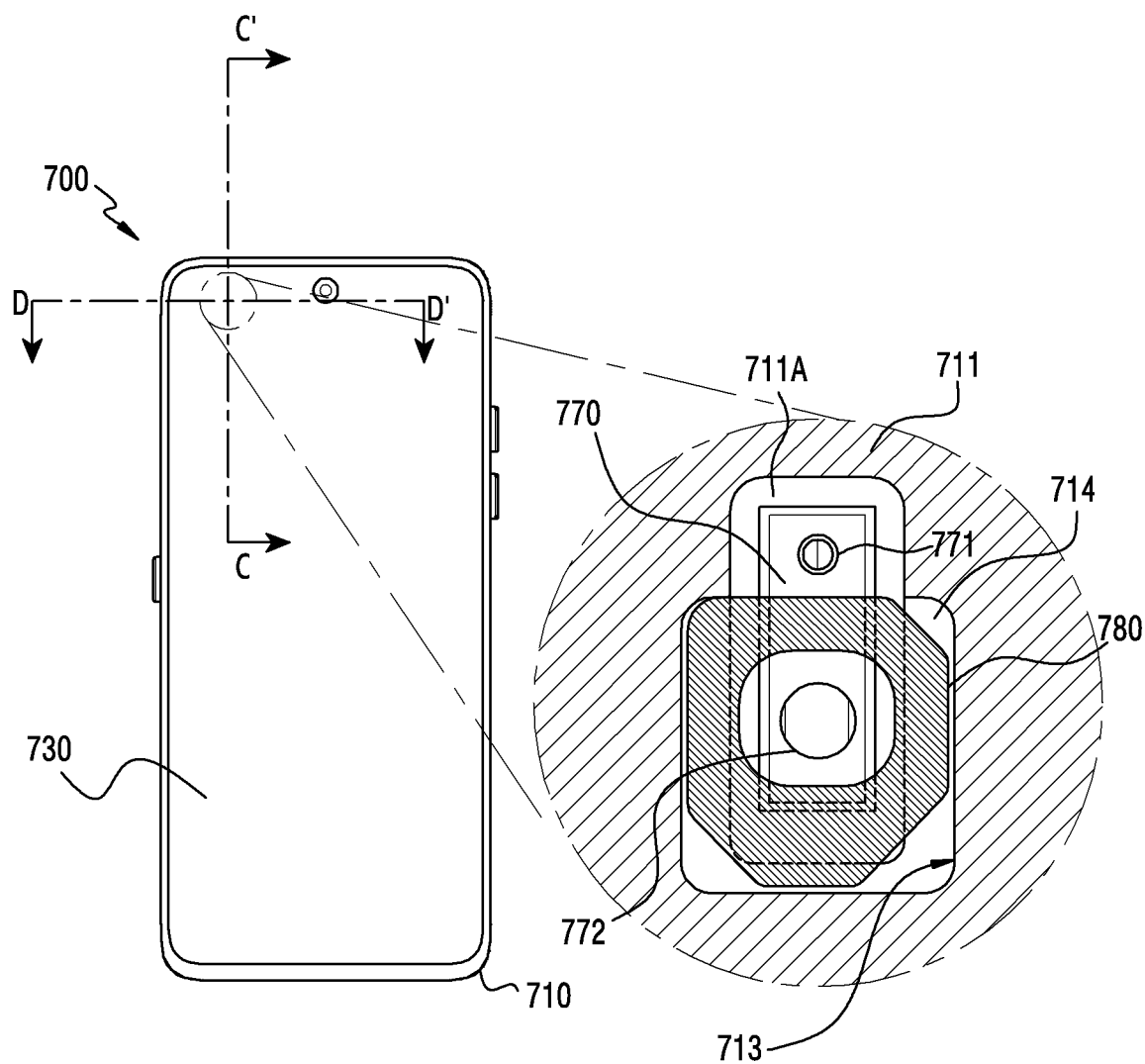
FIG. 7 shows a partition wall member and an optical sensor disposed on a back surface of a display of an electronic device, according to an embodiment.

FIG. 7 is a diagram illustrating a partition wall member 780 and an optical sensor 770 disposed on a rear surface of a display 730 of an electronic device 700, according to an embodiment.

With reference to FIG. 7, the electronic device 700 includes a housing 710, a support member 711, a display 730, an optical sensor 770, a partition wall member 780. At least one of the elements of the electronic device 700 may be the same or similar with the elements of the electronic device 300 of FIG. 3 or the electronic device 400 of FIG. 4, and duplicate description will be omitted below.

The support member 711 has at least one region in which an opening 711A is formed. The optical sensor 770 is positioned in the opening 711A.

The partition wall member 780 is located between the display 730 and the optical sensor 770, and it surrounds a light receiving unit 772 of the optical sensor 770 entirely. That is, the partition wall member 780, when seen from the top of the front of the housing 710, is formed in a columnar type having a donut or ring shape, and it surrounds the peripheral area of the light receiving unit 772 of the optical sensor 770 entirely.

As seen in FIG. 4, if the partition wall member 480 is formed into a shape surrounding (encompassing) a part (portion) area of a light receiving unit 472, the light diffusedly reflected on the display 430 may not be completely blocked by the partition wall member, and may be re-reflected in some areas of the partition wall member and may be introduced into the light receiving unit.

On the other hand, the electronic device 700 includes a partition wall member 780 surrounding the light receiving unit 772 entirely and able to reduce crosstalk that is generated due to the diffused reflection on the display 730 and flown into the light receiving unit 772. Additionally, the partition wall member 780 may also reduce crosstalk that is re-reflected on the partition wall member 780 and flown into the light receiving unit 772. The partition wall member 780 may be seated in a seating groove 714 formed in the support member 711.

Figure 8A:
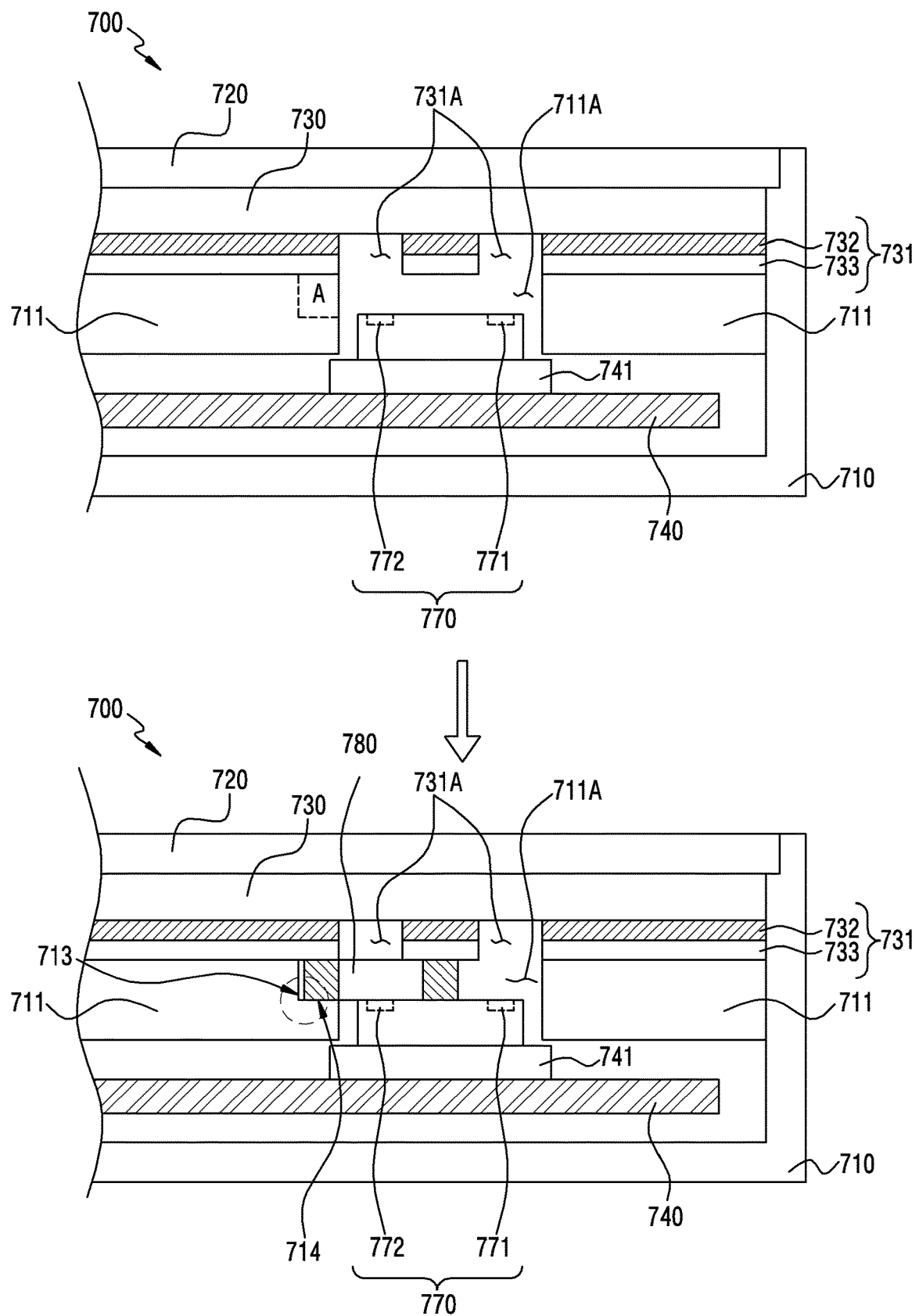
FIG. 8A is a cross sectional view of the electronic device of FIG. 7, taken in the direction C-C', according to an embodiment.
Figure 8B:
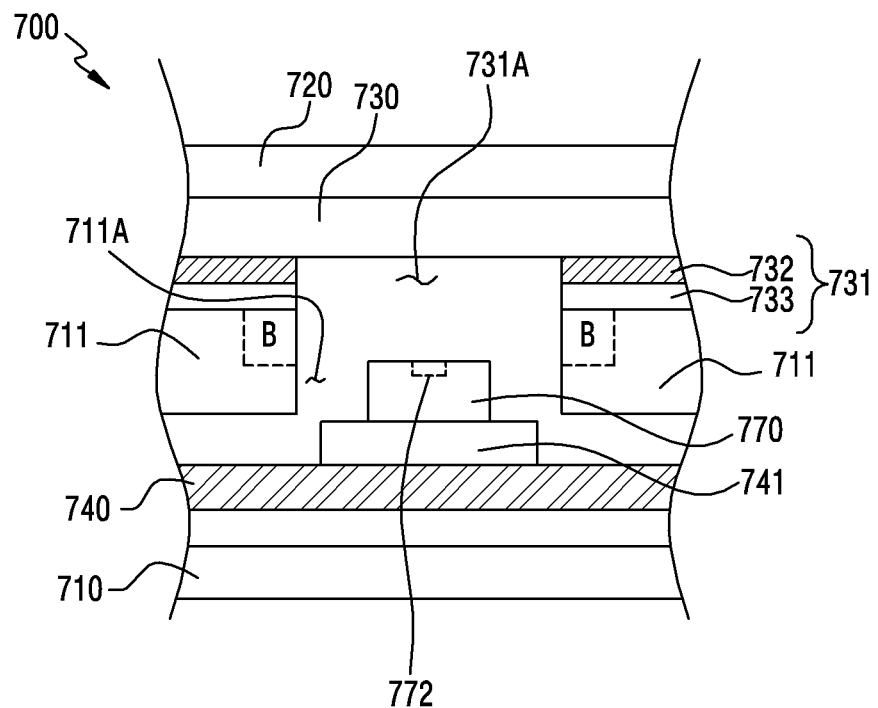
FIG. 8B is a cross sectional view of the electronic device of FIG. 7, taken in the direction D-D', according to an embodiment.
Figure 8B:
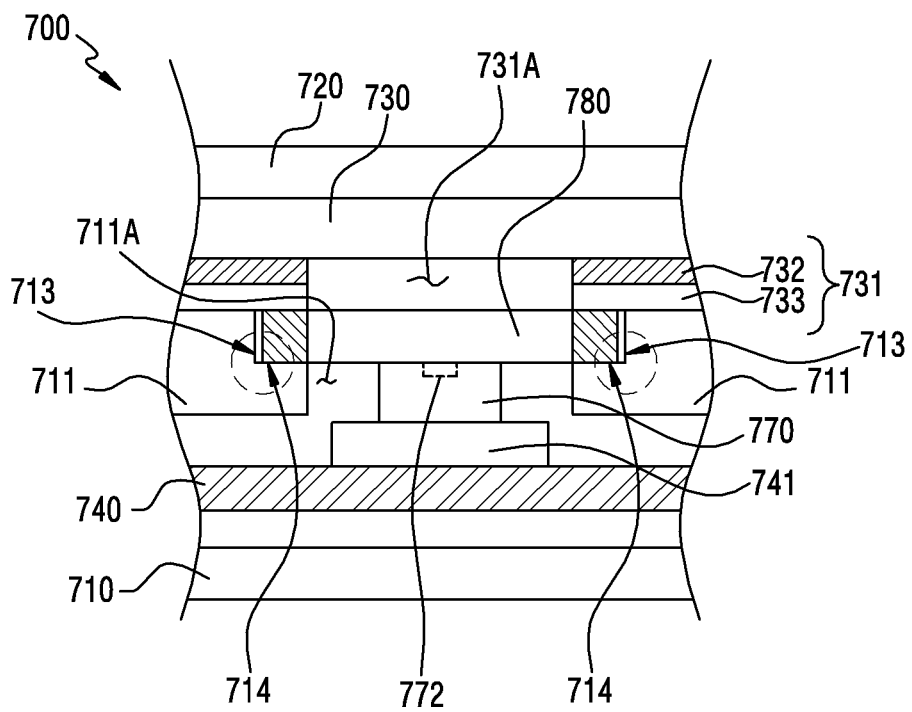

FIG. 8A is a cross sectional view of the electronic device of FIG. 7, taken in the direction C-C', according to an embodiment. FIG. 8B is a cross sectional view of the electronic device of FIG. 7, taken in the direction D-D', according to an embodiment.

Referring to FIG. 8A and FIG. 8B, an electronic device 700 includes a housing 710, a front plate 720, a display 730, a cover panel 731, a support member 711, an optical sensor 770, a partition wall member 780, an interposer 741, and a PCB 740. At least one of the components of the electronic device 700 may be the same or similar to one of the components of the electronic device 300 of FIG. 5A or 5B, and duplicate description will be omitted.

The cover panel 731 includes a black coated embossed layer 732 and a metal layer 733. The cover panel 731 has at least one region at which a hole 731A is formed. For example, at least one hole 731A is formed in an area corresponding to the positions of the light emitting unit 771 and the light receiving unit 772 of the optical sensor 770 located on the rear surface of the display 730 and it makes the light generated by the light emitting unit 771 pass through the display 730 or the light reflected by the object (e.g., a user) flow into the light receiving unit 772.

The support member 711 has an opening 711A passing through at least one region of the support member 711. The optical sensor 770 is located inside the opening 711A and is mounted on the back surface of the display 730.

The partition wall member 780 is formed into a shape that wraps around a light receiving unit 772 entirely. The partition wall member 780, when formed into a shape that wraps entirely around the light receiving unit 772, compared with when the partition wall member 780 is formed into a shape enclosing at least a part of the peripheral of the partition wall member 780, occupies a wider space. As a result, owing to the possibility that the partition wall member 780 may damage other components (e.g., the support member 711 or the display 730), securing a space for placing the partition wall member 780 is required.

In the electronic device 700 as shown in FIG. 8A and FIG. 8B, a partial region (e.g., a region A in FIG. 8A or a region B of FIG. 8B) of the support member 711 is removed to secure the mounting space for at least a part region of the partition wall member 780. For example, by removing at least one region of the opening 711A (e.g., the A area in FIG. 8A or the B area in FIG. 8B) adjacent (close) to the light receiving unit 772 of the optical sensor 770, a multi-stage structure 713 forming a shape of " ⌴ " is formed in the inner side of the opening 711A. As a result, the seating groove 714 is formed in at least one region inside of the opening 711A.

As shown in FIG. 7, a part of the partition wall member 780, that is, an area outside the outer circumferential surface of the opening 711A is seated in the seating groove 714. As the seating groove 714 with the multi-stage structure 713 is formed in at least some areas of inside of the opening 711A, the partition wall member 780 is formed into a shape that wraps fully around the light receiving unit 772 and, as a result, a blocking rate of crosstalk flowing into the light receiving unit 772 increases.

Figure 9A:
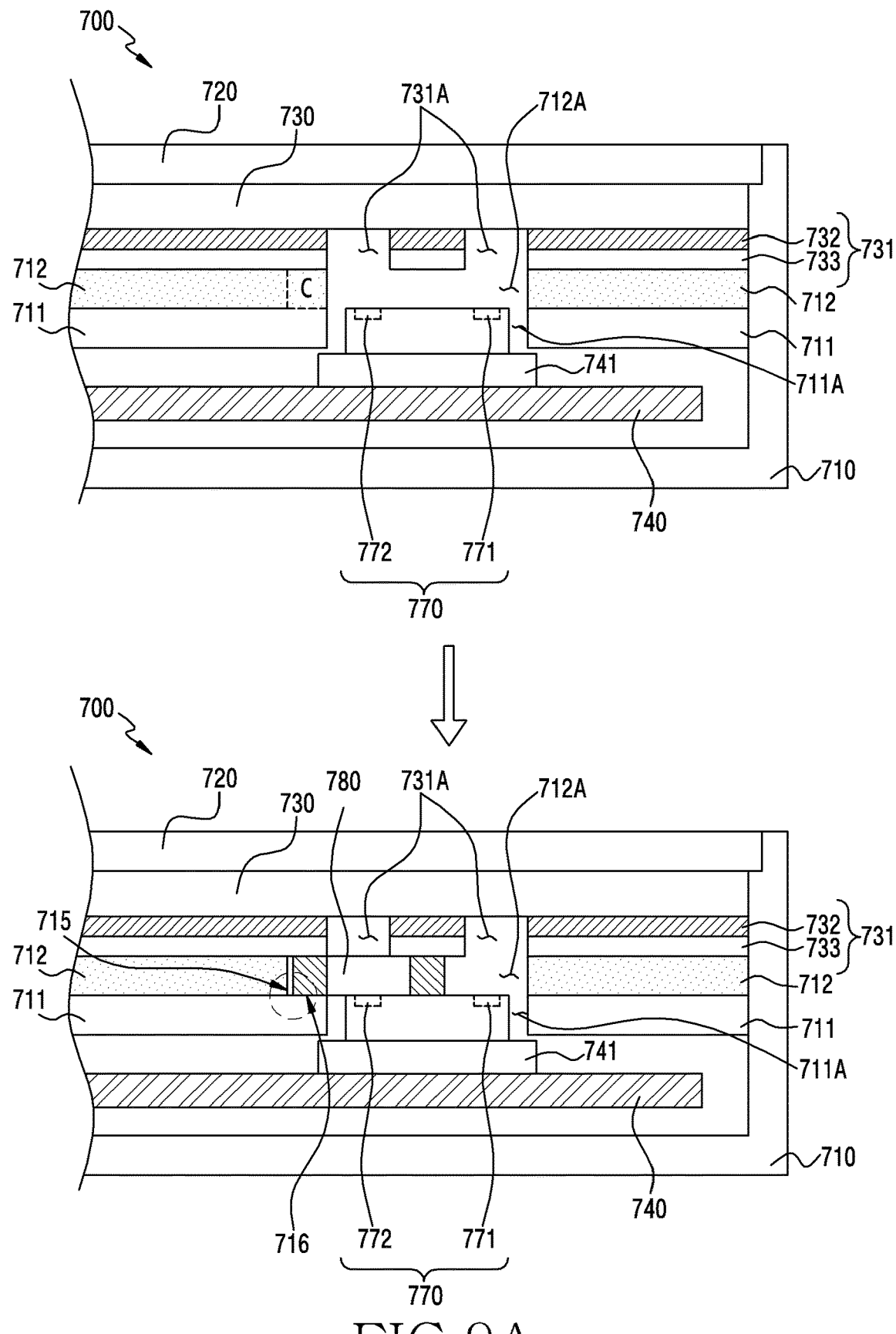
FIG. 9A is a cross sectional view of the electronic device of FIG. 7 taken in the direction C-C', according to an embodiment.
Figure 9B:
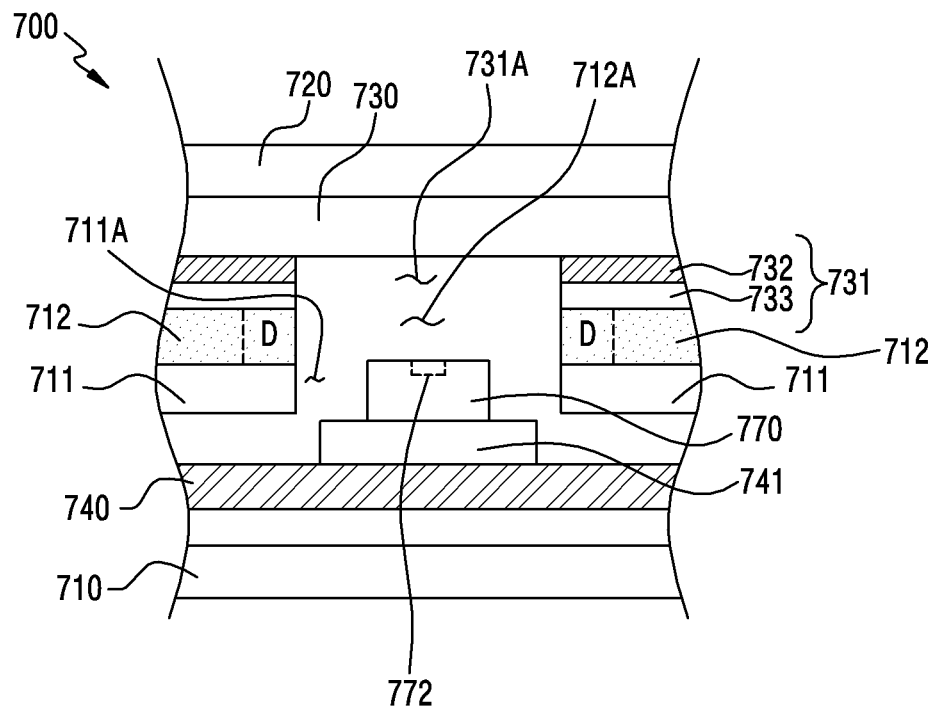
FIG. 9B is a cross sectional view of the electronic device of FIG. 7 taken in the direction D-D', according to an embodiment.
Figure 9B:
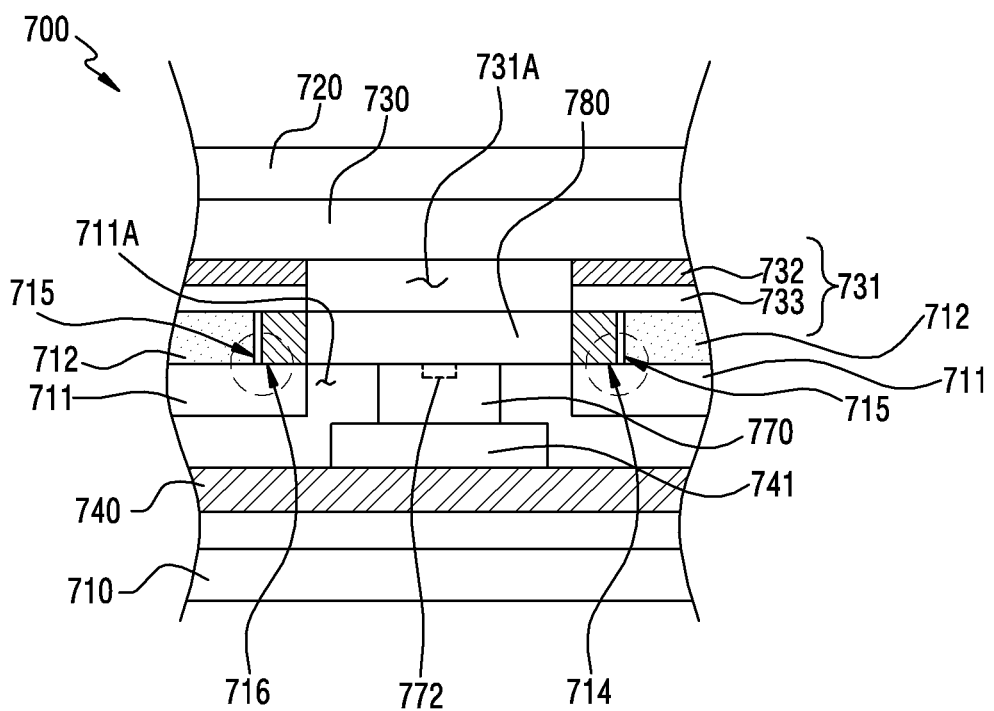

FIG. 9A is a cross sectional view of the electronic device of FIG. 7 taken in the direction C-C', according to an embodiment. FIG. 9B is a cross sectional view of the electronic device of FIG. 7 taken in the direction D-D', according to an embodiment.

Referring to FIG. 9A and FIG. 9B, an electronic device 700 includes a housing 710, a front plate 720, a display 730, a cover panel 731, a support member 711, an optical sensor 770, a partition wall member 780, an interposer 741, a PCB 740, and a waterproof layer 712. Description for the same or similar components as in FIG. 8A and FIG. 8B will be omitted.

The waterproof layer 712 is located between the cover panel 731 and the support member 711, and prevents water from flowing between the cover panel 731 and the support member 711. The waterproof layer 712 is formed of, for example, a waterproof tape and is attached to the lower surface of the cover panel 731 and the upper surface of the support member 711, respectively. The waterproof tape is merely one example of the waterproof layer 712 and a type of the waterproof layer is not limited thereto.

An opening 712A is formed in an area of the waterproof layer 712 corresponding to an opening 711A of the support member 711 to secure a space for mounting the optical sensor 770 at the back surface of the display 730. That is, the optical sensor 770 is located inside the opening 711A of the support member 711 and the opening 712A of the waterproof layer 712 to obtain information such as whether an object is present and/or whether an object approaches the electronic device 700 within a predetermined distance.

The partition wall member 780, as shown in FIG. 7, is formed in a columnar shape as a ring or a donut, when viewed from the top of the front surface 210A of the housing 710, so that it completely surrounds the area around the light receiving unit 772.

If the partition wall member 780 is formed into a shape that completely surrounds the area around the light receiving unit 772, the space occupied by the partition wall member 780 inside the housing 710 becomes widened, and the partition wall member 780 may damage the other components (e.g., the support member 711 or the display 730). Therefore, in order to prevent damage by the partition wall member 780 to other components within the housing 710, it is necessary to secure a space to place the partition wall member 780.

As shown in FIG. 9A and FIG. 9B, a part of a region (e.g., the C region in FIG. 9A and the D region in FIG. 9B) of a waterproof layer 712 is removed to secure a space (e.g., a mounting space) in which at least a portion of the partition wall member 780 is arranged. By removing at least a part of the region of the waterproof layer 712 close to the light receiving unit 772 of the optical sensor 770, a " ⌴ " shaped multi-stage structure 715 is formed between the waterproof layer 712 and the support member 711, which is lower than the waterproof layer 712. The multi-stage structure 715 formed between the waterproof layer 712 and the support member 711 exposes a partial region of the support member 711 to form the seating groove 716. A part of a region of the partition wall member 780 is seated in the seating groove 716.

The multi-stage structure 715 is formed in at least some areas inside of the openings 712A of the waterproof layer 712 so that a space for mounting the partition wall member 780 is provided. As a result, the partition wall member 780 is formed in a shape that completely surrounds the light receiving unit 772 in order not to damage the other components inside the housing 710.

Figure 10:
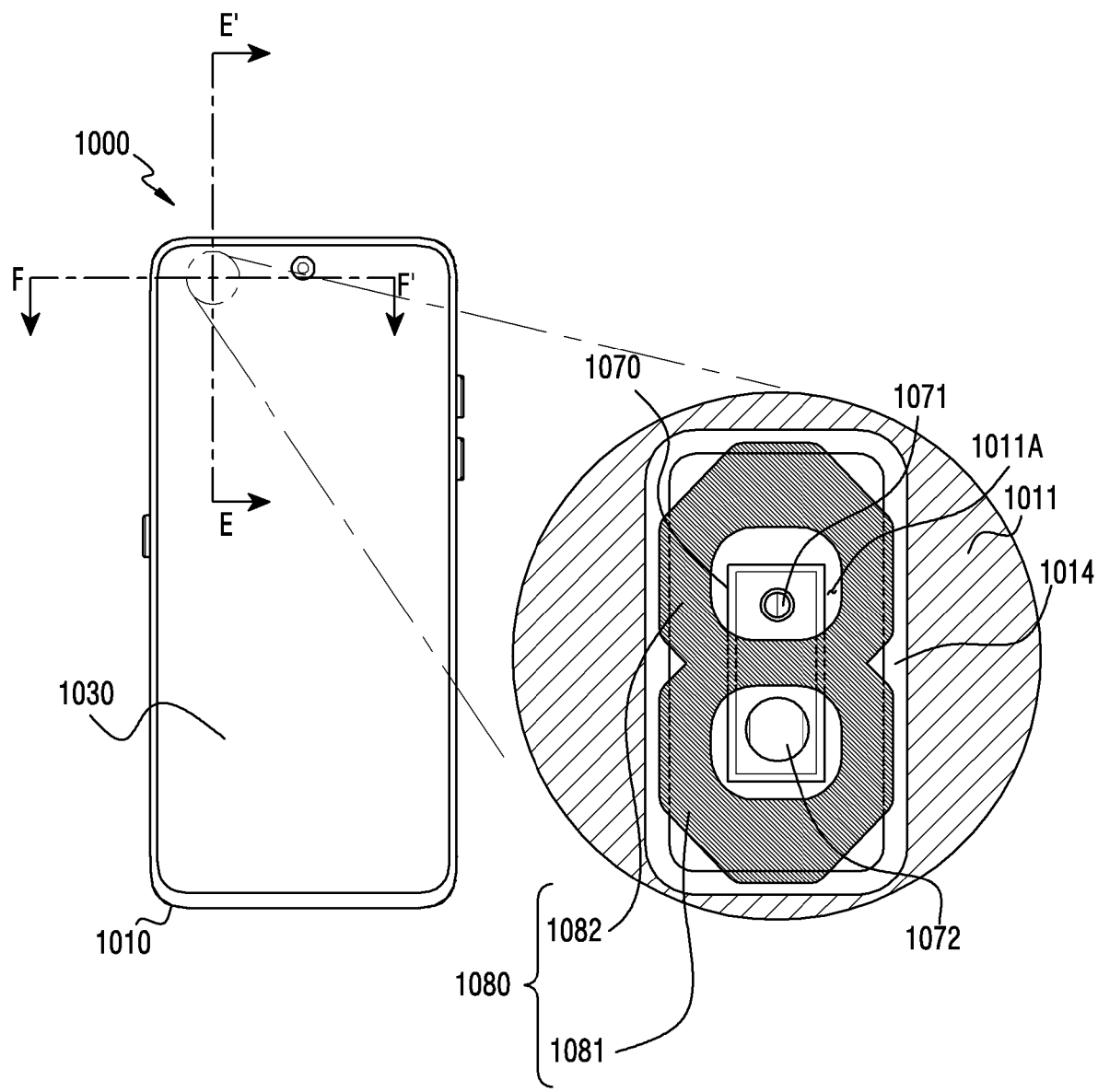
FIG. 10 shows a partition wall member and an optical sensor disposed on a back surface of a display of an electronic device, according to an embodiment.

FIG. 10 shows a partition wall member and an optical sensor disposed on a back surface of a display of an electronic device, according to an embodiment.

Referring to FIG. 10, an electronic device 1000 includes a housing 1010, a support member 1011, a display 1030, an optical sensor 1070, a partition wall member 1080. At least one of the components of the electronic device 1000 is the same or similar with at least one of the components of the electronic device 300 of FIG. 3, the electronic device 400 of FIG. 4, and the electronic device 700 of FIG. 7. Overlapping descriptions thereof are omitted.

An opening 1011A is formed in at least one area of the support member 1011 in order to provide a space to place the other components (e.g., the optical sensor 1070) in the support member 1011. For example, the optical sensor 1070 is located inside of the opening 1011A, and resultantly, is disposed on the back surface of the display 1030.

The partition wall member 1080 is located between the display 1030 and the optical sensor 1070, and includes the first partition wall 1081 and the second partition wall 1802. In one example, the first partition wall 1081, when viewed from top of the front surface 210A of the housing 1010, is formed of a columnar shape having a donut or a ring shape, and surrounds the peripheral area of the light receiving unit 1072 entirely. In yet another example, a second partition wall 1082, when viewed from top of the front surface 210A of the housing 1010, is formed of a columnar shape having a donut or a ring shape, and surrounds the peripheral area of the light emitting unit 1071 entirely. Owing to the first partition wall 1081 and the second partition wall 1082, the partition wall member 1080, when viewed from the top of the front surface of the housing 1010, is seen as an "8" shape.

The electronic device 1000 improves the blocking rate of the crosstalk that is introduced into the light receiving unit 1072 by the partition wall member 1080. The partition wall member 1080 entirely wraps up (surrounds) the light receiving unit 1072 and the light emitting unit 1071.

When foreign matter (e.g., dust) is introduced into the light emitting portion 1071 and/or the light receiving unit 1072, crosstalk due to the foreign matter may occur. The electronic device 1000 includes the partition wall member 1080 totally surrounding the light emitting unit 1071 and the light receiving unit 1072 to prevent the foreign matter from being introduced into the light emitting unit 1071 and the light receiving unit 1072, thereby improving the sensing performance of the optical sensor 1070. The partition wall member 1080 is seated on the seating groove 1014 formed in the support member 1011.

Figure 11A:
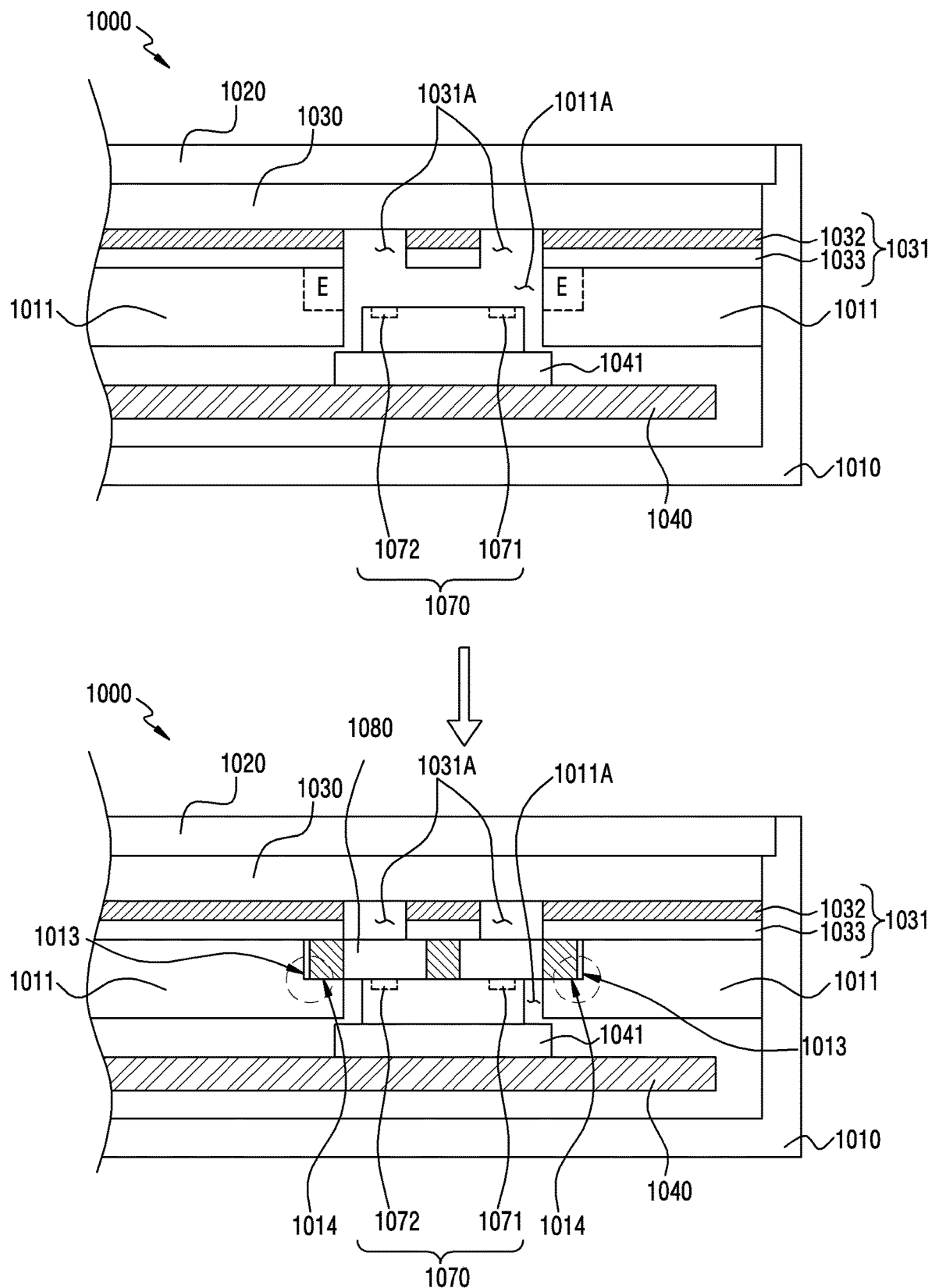
FIG. 11A is a cross sectional view of the electronic device of FIG. 10, taken along the direction E-E', according to an embodiment.
Figure 11B:
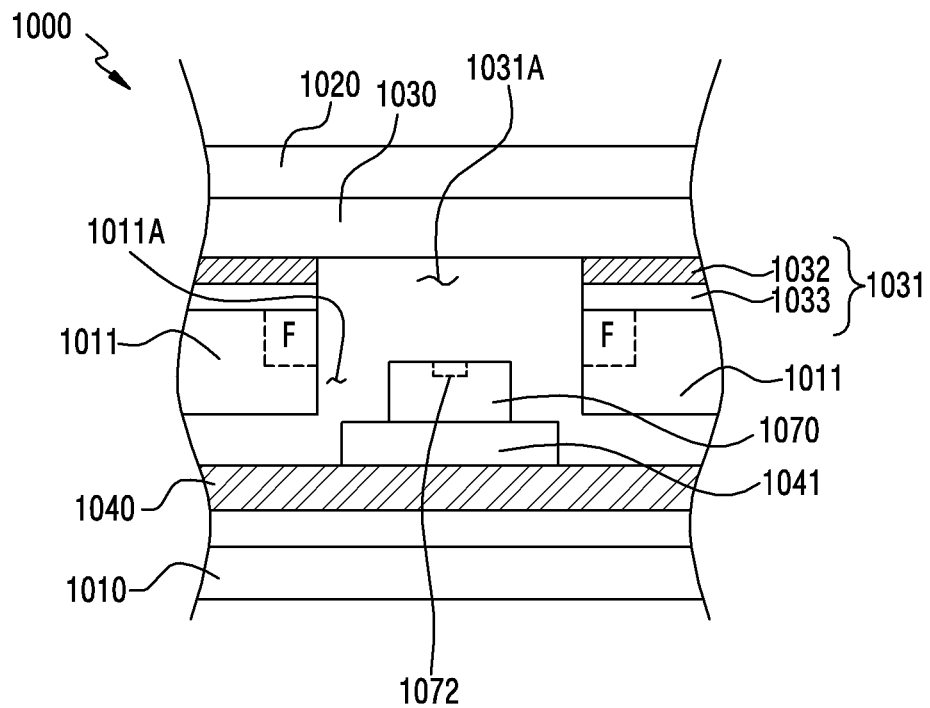
FIG. 11B is a cross sectional view of the electronic device of FIG. 10, taken along the direction F-F', according to an embodiment.
Figure 11B:
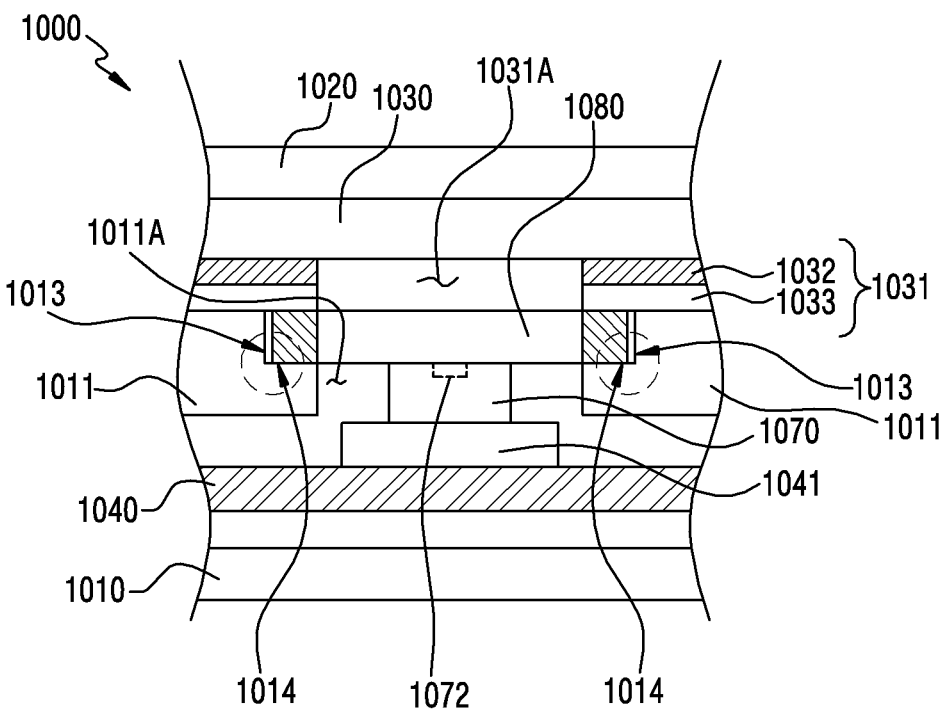

FIG. 11A is a cross sectional view of the electronic device of FIG. 10, taken along the direction E-E', according to an embodiment. FIG. 11B is a cross sectional view of the electronic device of FIG. 10, taken along the direction F-F', according to an embodiment.

Referring to FIG. 11A and FIG. 11B, an electronic device 1000 includes a housing 1010, a front plate 1020, a display 1030, a cover panel 1031, a support member 1011, an optical sensor 1070, a partition wall member 1080, an interposer 1041 and a PCB 1040. At least one of the components of the electronic device 1000 may be the same or similar to one of the components of the electronic device 700 of FIGS. 8A and 8B, and repeated descriptions thereof will be omitted.

The cover panel 1031 includes the black coated embossed layer 1032 and the metal layer 1033. The cover panel 1031 has at least one region in which at least a hole 1031A is formed. In one example, the hole 1031A is formed at a region corresponding to a position of the light emitting unit 1071 and a position of the light receiving unit 1072 of the optical sensor 1070 located on the back surface of a display 1030. The light generated from the light emitting unit 1071 passes through the display 1030, or the light reflected by an object (e.g., a user) flows into the light receiving unit 1072.

The support member 1011 includes an opening 1011A which passes through at least one region of the support member 1011, and the optical sensor 1070 is located inside of the opening 1011A and is mounted on the back surface of the display 1030.

The partition wall member 1080, as shown in FIG. 10, is formed in a shape that completely surrounds the light receiving unit 1072 and the light emitting unit 1071. The space of the partition wall member 1080 inside the housing 1010 is wide as a result of the partition wall member 1080 completely surrounding the light receiving unit 1072. As a result, there is a possibility that the partition wall member 1080 may damage the other elements (e.g., support member 1011 or the display 1030). Thus, it is essential to secure a space in the housing 1010 for placing the partition wall member 1080.

The electronic device 1000, as shown in FIG. 11a and FIG. 11b, has at least one region (e.g., E region in FIG. 11A or F region in FIG. 11B) of the support member 711 removed to secure an area (e.g., mounting space) in which at least a part of the partition wall member 1080 is arranged. By removing at least one region of the opening 1011A adjacent to the light receiving unit 1072 of the optical sensor 1070 and at least one region of the opening 1011A adjacent to the light emitting unit 1072, a multi-stage structure 1013 having a "∟" shape inside the opening 1011A is formed. As a result, a seating groove (an inner mounting groove) 1014 is formed in at least one region inside the opening 1011A and, as shown in FIG. 10, and an area deviated from the outer circumferential surface of the opening 1011A of the partition wall member 1080 seats in the seating groove 1014.

That is, since the seating groove 1014 having a multi-stage structure 1013 is formed in at least a partial area inside the opening 1011A, the partition wall member 1080 is able to entirely wrap up (surround) the light emitting unit 1071 and the light receiving unit 1072. As a result, even if the optical sensor 1070 is mounted on the back surface of the display 1030, the performance of the optical sensor 1070 may be maintained at the same level as the optical sensor 1070 mounted in the bezel area.

Figure 12A:
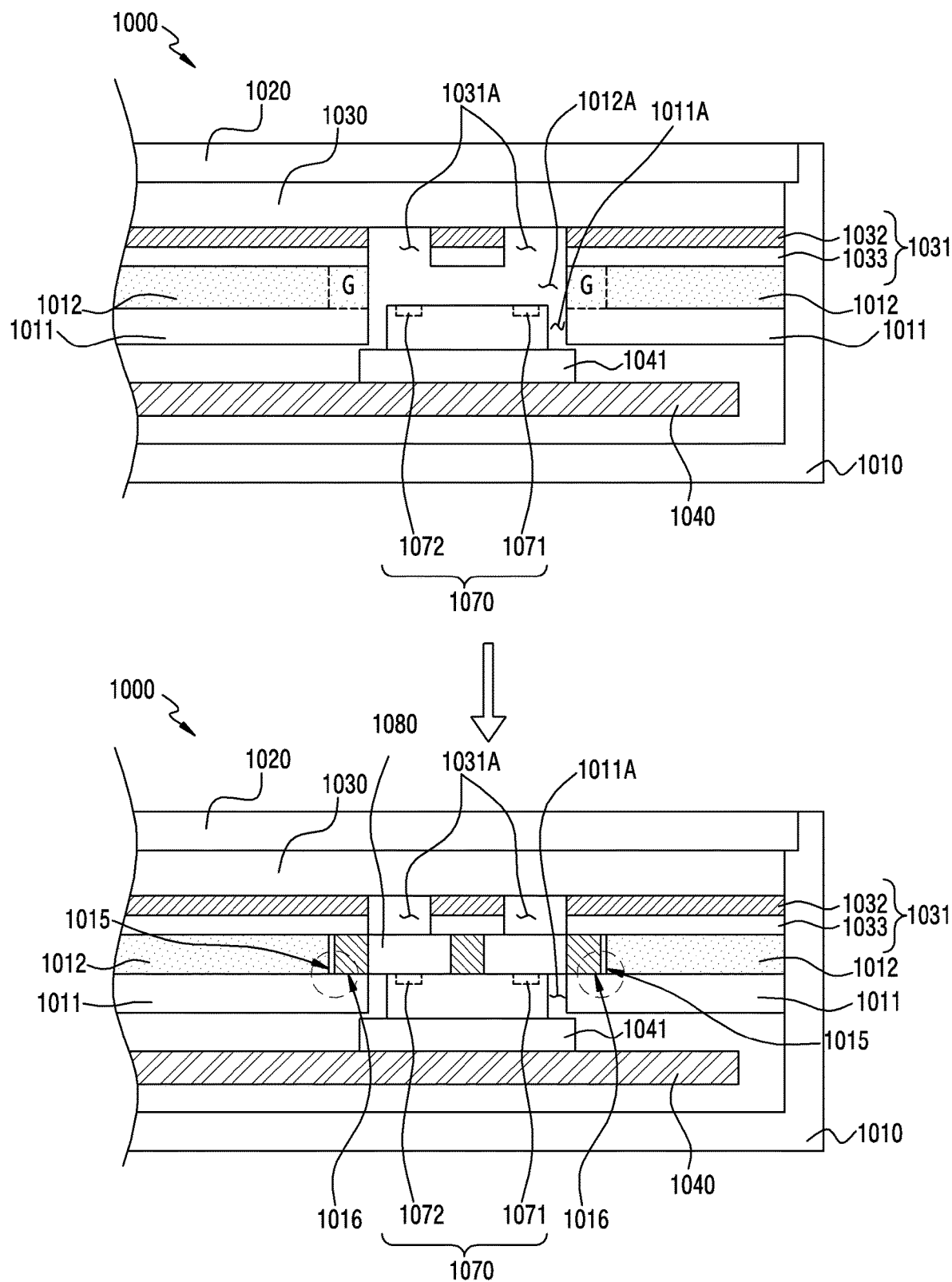
FIG. 12A is a cross sectional view of the electronic device of FIG. 10 taken along the direction E-E', according to an embodiment.
Figure 12B:
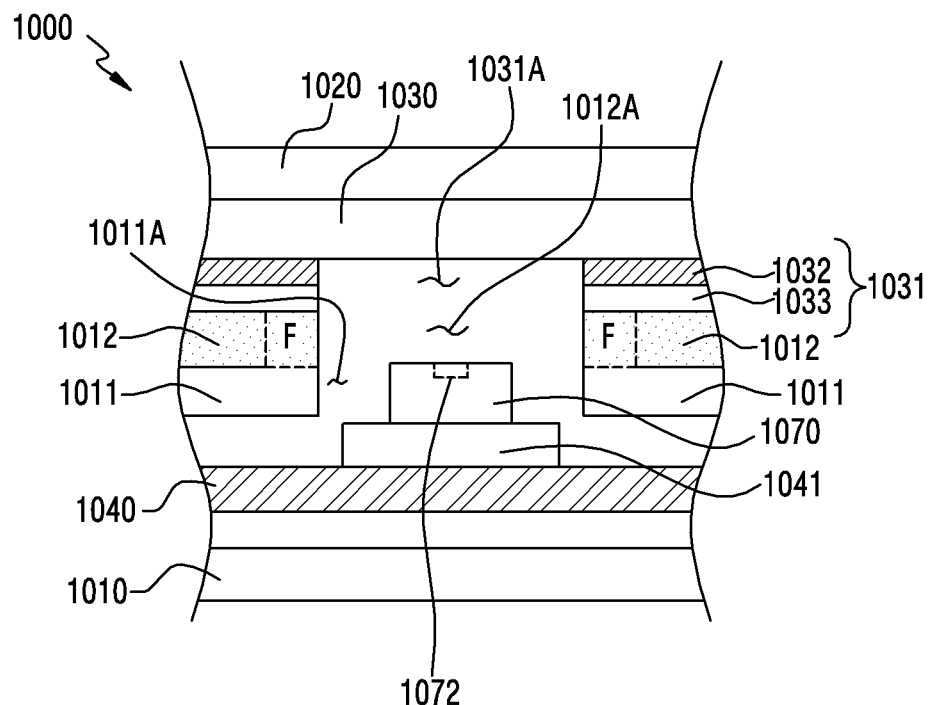
FIG. 12B is a cross sectional view of the electronic device of FIG. 10 taken along the direction F-F', according to an embodiment.
Figure 12B:
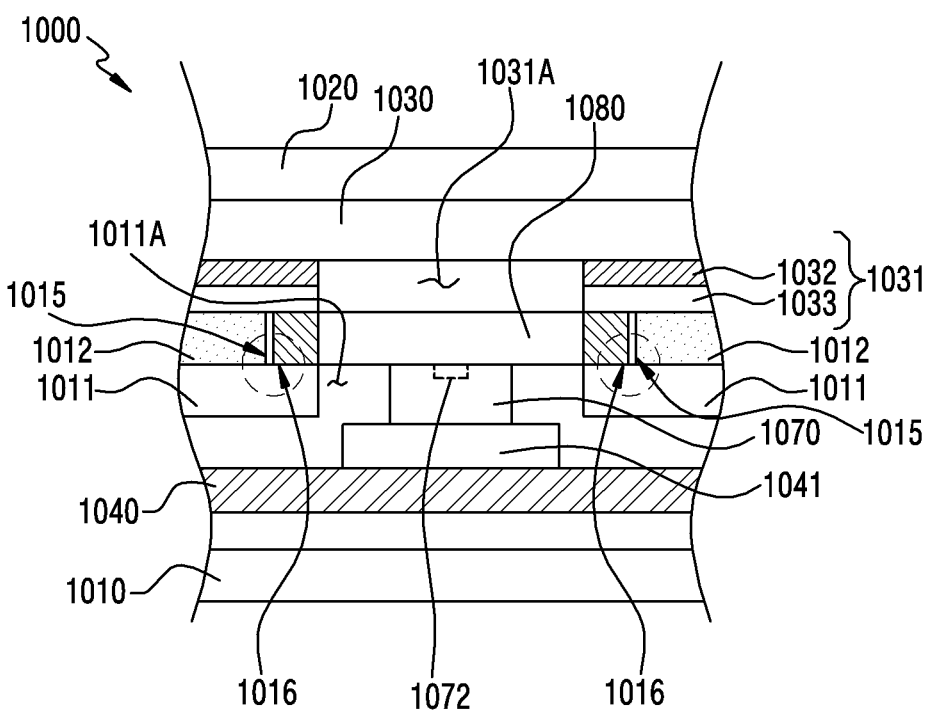

FIG. 12A is a cross sectional view of the electronic device of FIG. 10 taken along the direction E-E', according to an embodiment. FIG. 12B is a cross sectional view of the electronic device of FIG. 10 taken along the direction F-F', according to an embodiment.

Referring to FIG. 12A and FIG. 12B, an electronic device 1000 includes a housing 1010, a front plate 1020, a display 1030, a cover panel 1031, a support member 1011, an optical sensor 1070, a partition wall member 1080, an interposer 1041, a PCB 1040, and waterproof layer 1012 may be further included. A Descriptions of the same or similar components as those of FIG. 11A and FIG. 11B will be omitted.

The waterproof layer 1012 is positioned between the cover panel 1031 and the support member 1011 so that it is possible to prevent water from flowing between the cover panel 1031 and the support member 1011. The waterproof layer 1012 is formed, for example, as a waterproof tape and is respectively attached to bottom surface of the cover panel 1031 and upper surface of the support member 1011.

The opening 1012A is formed in a region of the waterproof layer 1012 corresponding to a region of the opening 1011A of support member 1011 so that a space for mounting the optical sensor 1070 on a back surface of the display 1030 is provided. That is, the optical sensor 1070 is located in the opening 1011A of the support member 1011 and the opening 1012A of the waterproof layer 1012 in order to obtain information, such as the presence or absence of an object and/or whether the object is approached.

The partition wall member 1080 is formed in a pillar type with an "8" shape, when viewed from the top of the front of the housing 1010, as shown in FIG. 10, and covers the peripheral areas of the light emitting unit 1071 and the light receiving unit 1072 entirely.

The partition wall member 1080 formed to completely surround the light emitting unit 1071 and the light receiving unit 1072 needs a wide space inside the housing 1010 and, as a result, the partition wall member 1080 may damage the other components (e.g., the support member 1011 or the display 1030). Therefore, securing a space for placing the partition wall member 1080 is required in order to prevent damage by the partition wall member 1080 to other components within the housing 1010.

A region (e.g., the E area in FIG. 11A or the F area in FIG. 11B) of the waterproof layer 712 is removed in order to secure the space in which at least a part of the partition wall member 1080 is placed.

By removing at least one region of the waterproof layer adjacent to the light receiving Unit 1072 of the optical sensor 1070 and at least one region of the waterproof layer 1012 adjacent to the light emitting unit 1071 of the optical sensor 1070, a "∟" shaped multi-stage structure 1015 is formed between the waterproof layer 1012 and the support member 1011. The multi-stage structure 1015 formed between waterproof layer 1012 and the support member 1011 exposes a partial region of the support member 1011, and the seating groove (mounting groove) 1016 is formed. A part of the partition wall member 1080 is seated in the seating groove 1016.

That is, as the multi stage structure 1015 is formed in at least some areas inside of the opening of the waterproof layer 1012, the seating groove 1016 is formed in the support member 1011 to secure a space in which the partition wall member 1080 is disposed. As a result, the partition wall member 1080 is formed to completely surround the light emitting unit 1071 and the light receiving unit 1072 without damaging the other components in the housing 1010.

Figure 13:
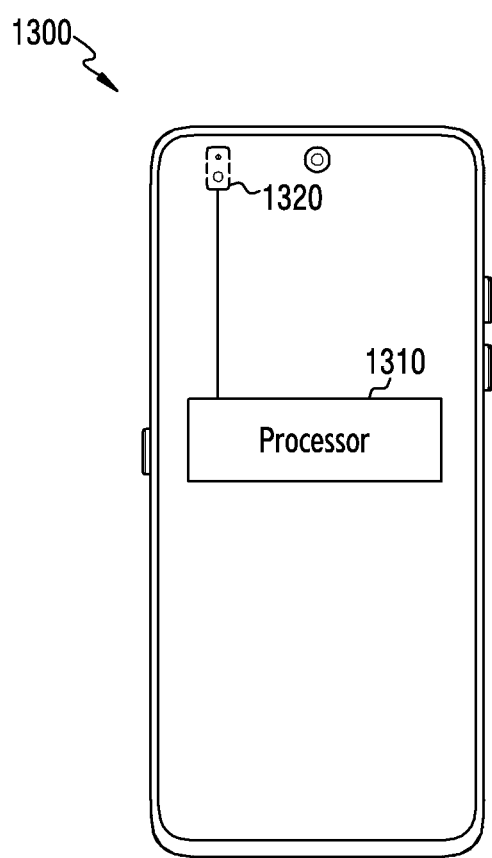
FIG. 13 shows an electrical connection between a processor and an optical sensor, according to an embodiment.

FIG. 13 shows an electrical connection between a processor and an optical sensor, according to an embodiment.

Referring to FIG. 13, the electronic device 1300 includes a processor 1310 and an optical sensor 1320 positioned on the back surface of the display 330. The optical sensor 1320 is electrically connected to the processor 1310 and the output value of the optical sensor 1320 is delivered to the processor 1310. The processor 1310 identifies the delivered output value of the optical sensor 1320 and controls the electronic device 1300 in response to the identified output value.

Additionally, the optical sensor 1320 may be electrically connected to a sensor hub, and the processor 1310 may receive the output value of the optical sensor 1320 from the sensor hub, and control the electronic device 1300.

Figure 14:
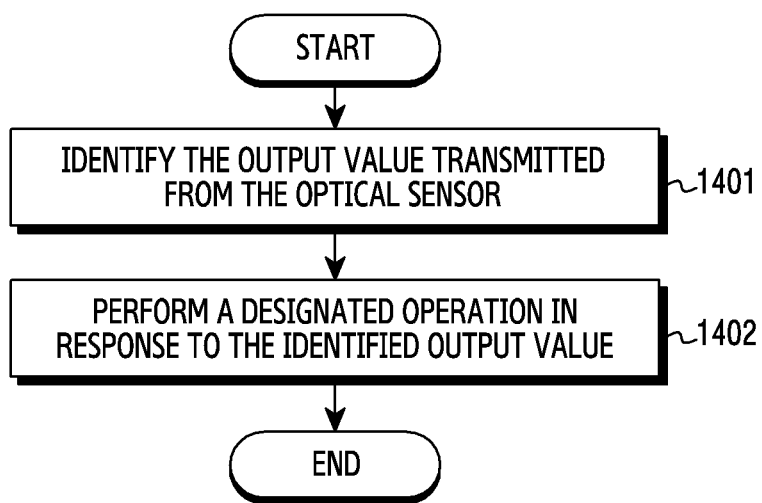
FIG. 14 is a flow chart representing an operation of controlling the electronic device in response to an output value of an optical sensor, according to an embodiment.

FIG. 14 is a flow chart representing an operation of controlling the electronic device in response to an output value of an optical sensor, according to an embodiment.

Referring to FIG. 14, in step 1401, a processor 1310 of an electronic device 1300 identifies the output value transmitted from the optical sensor 1320. The processor is able to receive an output value from the optical sensor mounted on the rear (back) surface of the display even when the display is activated, that is, in a driving state.

In step 1402, the processor 1310 of the electronic device determines information of an object (e.g., a user) based on the output value of the optical sensor 1320 identified in step 1401. For example, the processor 1310 may determine whether an object exists within a predetermined distance from the electronic device 1300 or whether the object is near (or using) the electronic device based on the output value of the optical sensor 1320. The processor 1310 controls driving of the electronic device based on the determined object information. The processor controls, based on the output value of the optical sensor identified in step 1401, whether to drive on/off the display and/or to drive on/off the always on display (AOD) mode. The processor determines whether the input touch is an erroneous touch based on the output value of the optical sensor identified in step 1401. The AOD mode may indicate a mode in which the display is always driven with low power.

In one example, based on the output values of the optical sensor and/or identifying driving of the receiver (e.g., through operation of the microphone hole), if the driving of the display is not necessary because the user is found to be on a call through the receiver, the processor controls the display to be turned off to avoid unnecessary power consumption. Additionally or alternatively, when the output value of the optical sensor indicates that the electronic device is located inside a bag pocket, the processor stops the operation of the AOD mode, as there is no need to actively maintain the AOD mode. Additionally or alternatively, when a result of identifying the output value of the optical sensor indicates that the user is found to be close to the electronic device, and the applications which are driven (i.e., being used) in the electronic device indicate that the user is calling, the processor determines whether the touch input on the display is an erroneous touch. Accordingly, the processor does not drive the display to respond to the erroneous touch when the touch is judged to be erroneous. When the touch is determined to not be erroneous, the processor drives the display to display data by responding to the touch, thereby providing information to the user.

An electronic device in accordance with various embodiments of the present disclosure includes a housing, a rear surface opposite to the front surface, and a side surface surrounding a space between the front surface and the rear surface, a display located inside the housing and viewed from (visible to) an outside of the electronic device through the front surface of the housing, a support member supporting the display by protruding from the side surface toward the inside of the housing, an optical sensor including a light emitting unit and a light receiving unit, located on the rear surface of the display, when viewed from a top of the front surface, so as to overlap with at least a portion of the display, a partition wall member, positioned between the display and the optical sensor, formed of an elastic material, wherein the partition wall member has at least a partial region located between the light emitting unit and light receiving unit to separate the light-emitting unit from the light receiving unit.

The partition wall member may be located in a compressed state between the display and the optical sensor.

The support member may include an opening penetrating at least a portion of the region of the support member, and the optical sensor may be located inside the opening.

The partition wall member may be formed in a shape surrounding at least a portion of the light receiving unit.

The partition wall member may be formed in a shape wrapping around (surrounding) the light receiving unit entirely.

The partition wall member may include a first partition wall surrounding at least a portion of the light receiving unit and a second partition wall surrounding at least some areas of the light emitting unit.

A seating groove with a multi-stage structure may be formed in at least one region of inside of the opening.

At least a portion of the partition wall member may be seated in the seating groove.

A processor operatively connected to the optical sensor may be further included, wherein the processor determines access of an external object in response to an output value of the optical sensor, and in response to the determination, performs a predetermined operation.

The processor may be configured to determine the access of the external object in response to an output value of the optical sensor even while driving the display (e.g., when the display is in an on-state).

The predetermined operation may include at least one of turning the display on, turning the display off, maintaining an AOD mode, or determining an erroneous touch.

An electronic device in accordance with various embodiments of the present disclosure, includes a housing including a front surface, a rear surface opposite to the front surface, and a side surface surrounding a space between the front surface and the rear surface, a display located inside the housing, visible to an outside of the electronic device through the front surface of the housing, a waterproof layer attached to the rear surface of the display, a support member, located on the rear surface of the waterproof layer, supporting the display by protruding from the side surface toward the inside of the housing, an optical sensor including a light emitting unit and a light receiving unit, located on the rear surface of the display, when viewed from a top of the front surface, to overlap at least one area of the display, and a partition wall member, formed of an elastic material, located between the optical sensor and the display wherein the partition wall member has at least a portion located between the light emitting unit and the light receiving unit to separate the light emitting unit and the light receiving unit.

The partition wall member may be formed of a shape surrounding at least a portion of the light receiving unit.

The partition wall member may be formed in a shape wrapping around the light receiving unit entirely.

The partition wall member may include a first partition wall surrounding at least a partial area of the light receiving unit and a second partition wall surrounding at least a partial area of the light emitting unit.

The waterproof layer may include a first opening penetrating at least a portion of the waterproof layer, and the support member may include a second opening penetrating an area corresponding to the area of the first opening.

The optical sensor may be located inside the first opening and the second opening.

The multi-stage structure may be formed between at least one region inside the first opening and at least one region inside the second opening corresponding to the at least one region inside the first opening. A seating groove, inside the second opening, may be formed in which at least a portion of the partition wall member is seated.

A processor electrically connected to the optical sensor may be further included wherein the processor determines access of an external object in response to an output value of the optical sensor, and in response to the determination, performs a predetermined operation.

The processor may be configured to determine the access of the external object in response to an output value of the optical sensor even when the display is being driven in an on-state.

Accordingly, the electronic device according to various embodiments of the present disclosure may reduce a cross-talk caused by diffused reflection, thereby reducing performance degradation of an optical sensor that occurs when the optical sensor is mounted on a back surface of a display.

Also, in the electronic device according to various embodiments, when a user input is applied to the display, damage to the display by the optical sensor is reduced.

In the embodiments of the present disclosure described above, the components included in the disclosure are expressed in singular or plural according to the specific embodiments presented. However, the singular or plural expressions are appropriately selected for the situation presented for convenience of explanation, and the present disclosure is not limited to the singular or plural components, and even the components expressed in plural can be composed of a singular component, or even the expressed components in singular can be composed of a plural components.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a housing including a front surface, a rear surface opposite to the front surface, and a side surface surrounding a space between the front surface and the rear surface;
   a display located inside the housing and visible to outside of the electronic device through the front surface of the housing;
   a support member protruding from the side surface toward the inside of the housing to support the display, wherein the support member includes an opening penetrating at least a partial region of the support member;
   an optical sensor including a light emitting unit and a light receiving unit, wherein the optical sensor is located on a rear surface of the display and overlaps at least one area of the display when viewed from top of the front surface, and wherein the optical sensor is located inside the opening; and
   a partition wall member formed of an elastic material, wherein the partition wall member is formed to entirely enclose the light receiving unit,
   wherein the partition wall member is located between the display and the optical sensor, and
   wherein at least a part region of the partition wall member is located between the light emitting unit and the light receiving unit to separate the light emitting unit and the light receiving unit.

2. The electronic device of claim 1, wherein the partition wall member is positioned in a compressed state between the display and the optical sensor.

3. The electronic device of claim 1, wherein the partition wall member includes a first partition wall surrounding at least a first portion of the light receiving unit and a second partition wall surrounding at least a second portion of the light emitting unit.

4. The electronic device of claim 1, wherein a seating groove with a multi-stage structure is formed in at least one region inside the opening.

5. The electronic device of claim 4, wherein at least a portion of the partition wall member is seated in the seating groove.

6. The electronic device of claim 1, further comprising a processor operatively connected to the optical sensor wherein the processor determines whether an external object is within a predetermined distance from the electronic device in response to an output value of the optical sensor, and performs a designated operation in response to a determination.

7. The electronic device of claim 6, wherein the processor determines whether the external object is within a predetermined distance from the electronic device in response to the output value of the optical sensor when the display is in an on-state.

8. The electronic device of claim 6, wherein the designated operation includes a turning on mode of the display, a turning off mode of the display, an always on display (AOD) mode of the display, or determining whether an input touch is an erroneous touch input.

9. An electronic device comprising:
   a housing including a front surface, a rear surface opposite to the front surface, and a side surface surrounding a space between the front surface and the rear surface;
   a display located inside the housing and visible to outside of the electronic device through the front surface of the housing;
   a waterproof layer attached to the rear surface of the display, wherein the waterproof layer includes a first opening penetrating at least a portion of region of the waterproof layer; a support member, positioned on the rear surface of the waterproof layer, protruding from the side surface toward the inside of the housing to support the display, wherein the support member includes a second opening penetrating a region of the support member corresponding to the first opening;
   an optical sensor including a light emitting unit and a light receiving unit wherein the optical sensor is located on a rear surface of the display and overlaps at least one area of the display when viewed from top of the front surface, wherein the optical sensor is located inside the first opening and the second opening; and a partition wall member formed of an elastic material wherein the partition wall member is located between the display and the optical sensor, wherein at least a part region of the partition wall member is located between the light emitting unit and the light receiving unit to separate the light emitting unit and the light receiving unit.

10. The electronic device of claim 9, wherein the partition wall member is formed to surround at least a portion of the light receiving unit.

11. The electronic device of claim 10, wherein the partition wall member is formed to entirely enclose the light receiving unit.

12. The electronic device of claim 9, wherein the partition wall member includes a first partition wall surrounding at least a first portion of the light receiving unit and a second partition wall surrounding at least a second portion of the light emitting unit.

13. The electronic device of claim 9, wherein a multi-stage structure is formed between at least one region inside the first opening and at least one region inside the second opening corresponding to the at least one region inside the first opening, and a seating groove through which at least a portion of the partition wall member is seated is formed inside the second opening.

14. The electronic device of claim 9, further comprising a processor that is electrically connected to the optical sensor wherein the processor, in response to an output value of the optical sensor, determines whether an external object is within a predetermined distance from the electronic device in response to the output value of the optical sensor, and performs a designated operation in response to a determination.

15. The electronic device of claim 9, wherein the processor determines whether the external object is within a predetermined distance from the electronic device in response to an output value of the optical sensor when the display is in an on-state.

* * * * *